United States Patent [19]

Eaton

[11] Patent Number: 5,492,027
[45] Date of Patent: Feb. 20, 1996

[54] ROTARY SHIFT CONTROL VALVING MECHANISM FOR A POWER TRANSMISSION

[75] Inventor: James R. Eaton, Carmel, Ind.

[73] Assignee: General Motors Corporation, Detroit, Mich.

[21] Appl. No.: 310,456

[22] Filed: Sep. 22, 1994

[51] Int. Cl.$^6$ .................................................. F16H 59/04
[52] U.S. Cl. ................................................................ 74/335
[58] Field of Search .................................................. 74/335

[56] References Cited

U.S. PATENT DOCUMENTS

| | | | |
|---|---|---|---|
| 2,835,136 | 5/1958 | Berthiez | 74/335 |
| 5,009,116 | 4/1991 | Ordo et al. | 74/331 |
| 5,233,878 | 8/1993 | Klemen et al. | 74/346 |

Primary Examiner—Dirk Wright
Attorney, Agent, or Firm—Donald F. Scherer

[57] ABSTRACT

An automatic transmission drive ratio control for operating a five speed automatic transmission is provided. The control is particularly adapted for use with a twin countershaft automatic transmission that requires only one torque transfer device for each drive ratio. A system of valves is employed to direct the flow of pressurized fluid necessary for the on-going actuation of each drive ratio and the simultaneous off-going actuation of the previously actuated drive ratio. The flow control for actuating and deactuating the torque control devices is directly effected by a two-position spool valve operating in concert with a rotary valve, pressurized hydraulic fluid used to position the spool valve and the rotary valve is primarily provided by three on/off solenoid shift control valves. A failure of the electrical supply to the solenoid valves will effect a shift to the third drive ratio when the transmission is operating in the first through fourth drive ratios, but will effect a shift to the fifth drive ratio should the electrical failure occur while operating in the fifth drive ratio.

17 Claims, 14 Drawing Sheets

ROTARY SHIFT CONTROL VALVING MECHANISM FOR A POWER TRANSMISSION

TECHNICAL FIELD

The present invention relates generally to controls for power transmissions. More particularly, the present invention relates to hydraulic controls particularly adapted for sequentially actuating the torque transfer device, by which to effect sequential drive ratios in transmissions. Specifically, the present invention relates to a control valving mechanism for an automatic transmission that provides five drive ratios with only three on/off solenoid valves in combination with one rotary sequencing valve and one two-position spool valve.

BACKGROUND OF THE INVENTION

The use of a hydraulic piston to control the position of a synchronizer sleeve is well known. A representative system of that type is shown in U.S. Pat. No. 5,233,878 issued Aug. 10, 1993, in the name of Klemen et al. and assigned to the assignee of the present invention. These systems have a double acting piston which is pressurized to translate a shift fork to predetermined operating positions. The shift fork is operatively connected with a synchronizer which—in combination with fluid-operated torque control devices, generally in the nature of clutches or brakes—establishes two distinct power paths in a countershaft transmission, such as that shown in U.S. Pat. No. 5,009,116 issued Mar. 30, 1990, in the name of Ordo et al. and assigned to the assignee of the present invention. In the above-noted patents, a hydraulically operated shift fork controls positioning of the forward-reverse synchronizer. When the synchronizer has been positioned, the power path in a transmission, such as a twin countershaft transmission, is completed by engaging the appropriate fluid-operated torque transfer device.

Heretofore, a plurality of mechanical, hydraulic or electrical arrangements, as well as combinations thereof, have been devised to operate the several torque transfer devices used in power transmissions to sequence the drive ratios or "gears" provided by the transmission. The present invention is directed to a simplified arrangement that is particularly adapted to effect sequential operation of a twin countershaft automatic transmission that provides five drive ratios.

SUMMARY OF THE INVENTION

It is, therefore, a primary object of the present invention to provide an improved transmission control for effecting selective sequencing of a five speed twin countershaft automatic transmission.

It is another object of the present invention to provide an improved transmission control, as above, wherein only three on/off solenoid valves control the on-coming and off-going hydraulic pressures that are applied to actuate and deactivate the torque transfer devices by which sequencing of the transmission through the drive ratios is effected.

It is a further object of the present invention to provide an improved transmission control, as above, wherein a two-position spool valve is employed in combination with a rotary sequencing valve to direct the flow of pressurized fluid to and from the appropriate torque transfer devices to effect each drive ratio.

It is still another object of the present invention to provide an improved transmission control, as above, wherein only one torque transfer device is required for operation of each drive ratio.

It is yet another object of the present invention to provide an improved transmission control, as above, which permits selective application of the on-going pressure as well as the off-going pressure to effect any desired overlap between activation and deactivation of the on-going torque transfer device relative to the off-going torque transfer device.

It is still a further object of the present invention to provide an improved transmission control, as above, wherein the failure of the electrical power system during operation within the first through fourth drive ratios automatically reverts to the third drive ratio.

It is an even further object of the present invention to provide an improved transmission control, as above, wherein the failure of the electrical power system during operation within the fifth drive ratio automatically reverts to the fifth drive ratio.

These and other objects of the invention, as well as the advantages thereof over existing and prior art forms, which will be apparent in view of the following detailed specification, are accomplished by means hereinafter described and claimed.

In general, a transmission control valving mechanism embodying the concepts of the present invention utilizes a source of fluid pressure. A two-position spool valve has a control chamber that is selectively connected to the source of fluid pressure. Specifically, a control conduit directs the pressurized hydraulic fluid from an on/off solenoid valve to the control chamber in the spool valve in order to effect a pressure-set position of the spool valve member in that spool valve when the associated on/off solenoid valve is "on" (hydraulically open). A spring biases the spool valve member in the spool valve to effect a spring-set position when the first on/off solenoid valve is "off" (hydraulically closed).

A rotary valve has a housing with a cylindrical bore therein. A rotor is received within the cylindrical bore, and the rotor may be selectively sequenced through a plurality of angular dispositions. A pressure feed passage is provided in the rotor. Control means selectively rotate the rotor to each of a plurality of angular dispositions. The feed passage in the rotor communicates with a selected torque transfer device at each of the angular dispositions of the rotor to apply on-going hydraulic pressure to that torque transfer device. Exhaust passageways are also provided in the rotor. The exhaust passageways communicate with at least an off-going torque transfer device at each of the angular dispositions of the rotor.

A modulating solenoid valve selectively directs pressurized hydraulic fluid to and through the spool valve. That pressurized fluid actuates the selected torque transfer friction devices required to provide the desired sequential drive ratios.

To acquaint persons skilled in the arts most closely related to the present invention, one preferred embodiment of a rotary control valving mechanism that illustrates a best mode now contemplated for putting the invention into practice is described herein by, and with reference to, the annexed drawings that form a part of the specification. The exemplary rotary control valving mechanism is described in detail without attempting to show all of the various forms and modification in which the invention might be embodied. As such, the embodiment shown and described herein is illustrative, and as will become apparent to those skilled in

DESCRIPTION OF AN EXEMPLARY EMBODIMENT

Figure 1:
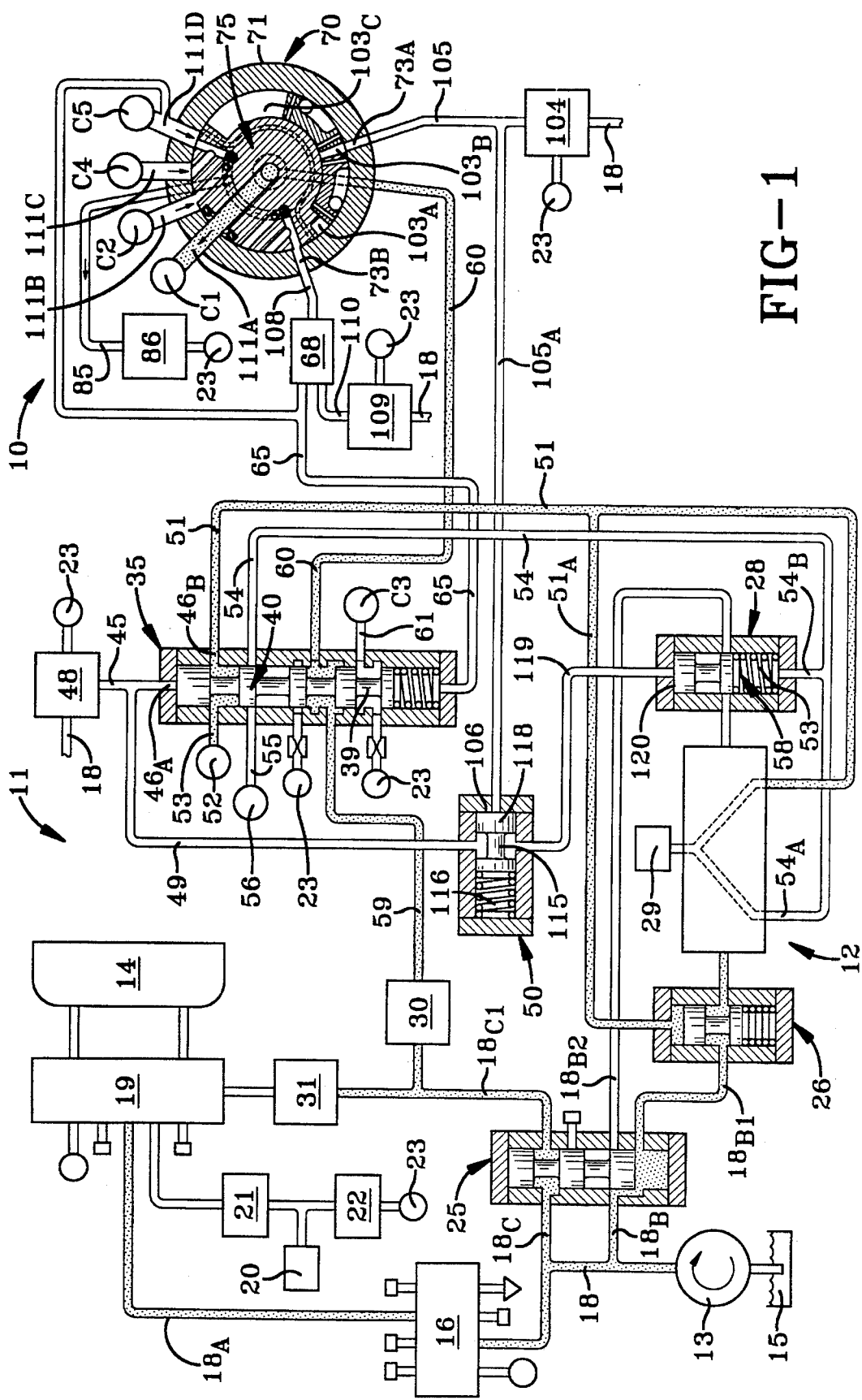
FIG. 1 is a diagrammatic representation of an overall power transmission shifting system incorporating not only a manual range selector valve and a two-position spool valve but also a subassembly in the nature of a rotary control valve mechanism—the latter subassembly employing the concepts of the present invention and being depicted in the first drive ratio of the forward drive range.

One representative form of a rotary hydraulic shift control valving mechanism for a power transmission embodying the concepts of the present invention, and adapted selectively to engage and disengage conventional torque transmitting devices—which may be in the nature of brakes and/or clutches—appropriate for the drive or gear ratio to be sequentially engaged and/or disengaged is designated generally by the numeral on the accompanying drawings. The rotary control valve 10 is incorporated in a shifting system designated generally by the numeral 11.

The shifting system 11 incorporates a typical transmission shift fork control identified generally by the numeral 12.

To facilitate an understanding of the present invention, the shifting system 11 includes means for providing a source of pressurized hydraulic fluid, such as a pump 13, that may be driven by an engine (not shown) through a conventional torque converter and power transmission assembly—the combination being identified generally by the numeral 14. A countershaft type transmission, such as that shown in the aforesaid U.S. Pat. No. 5,009,116, may be driven by the torque converter in a conventional manner.

The pump 13 delivers fluid from a reservoir 15 to a conventional regulating valve 16 which establishes the maximum pressure for the hydraulic fluid delivered by the main feed conduit 18 and its branches, identified by the number 18 and a letter subscript. After the pressure requirement in the main feed conduit 18 is established, the excess fluid is directed to the converter control valve 19, as by branch feed conduit $18_A$. The converter control valve 19 supplies pressurized hydraulic fluid to the torque converter and power transmission assembly 14 as well as to a conventional lubrication 20 and cooling system 21. A separate lubrication system regulator 22 may be employed to control hydraulic pressure to the lubrication system 20, and the regulator 22 will dump excess hydraulic fluid to the return system 23, which directs the hydraulic fluid back to the reservoir 15.

Branches $18_B$ and $18_C$ of the main feed conduit 18 are in fluid communication with a manual range selection valve 25 and through the range selection valve 25 to subbranch feed conduits $18_{B1}$ and $18_{B2}$ as well as to subbranch feed conduit $18_C$. The subbranch feed conduits $18_{B1}$ and $18_{B2}$ communicate with shift fork control mechanism 12 in a manner well known to the art. The manual range selection valve 25 selectively controls the shift fork control mechanism 12 via either a forward flow control valve 26 or a reverse flow control valve 28.

Closely related but different structural members, components or arrangements will generally be identified by the common numerical designation applied to the originally identified member, component or arrangement, but the subsequent variation shall be identified by a letter, and/or an alphanumeric, subscript used in combination with the number. Thus, the main feed conduit is identified by the number 18, but the branches will be identified with the alphanumeric designation $18_A$, $18_B$, $18_C$, etc. and the subbranches are $18_{B1}$, $18_{B2}$, etc. This convention shall be employed throughout the specification.

The details of the hydraulic connections between, and operation of, a manual range selector valve, such as identified herein by the numeral 25, the forward and reverse flow control valves 26 and 28, respectively, as well as a shift fork control mechanism 12, are fully described in the copending U.S. patent application, Ser. No. 08/104,967, filed on Aug. 10, 1993, in the name of Raszkowski and owned by General Motors Corporation, the assignee of the present invention, and will not, therefore, be repeated herein except to the extent necessary to facilitate an explanation of the present invention.

Suffice it to say that when the manual range selection valve 25 is disposed in the forward drive range as depicted in FIG. 1, pressurized hydraulic fluid provided by the pump 13 will be delivered to the branch feed conduits $18_A$, $18_B$ and $18_C$ at a controlled pressure, as determined by the regulator 16. In the forward drive range, regulated line pressure is directed through manual selector valve 25 to the forward flow control valve 26 by subbranch feed conduit $18_{B1}$. As is described in the aforesaid U.S. patent application, Ser. No. 08/104,967, pressurized fluid from the forward flow control valve 26 positions the shift fork control mechanism 12 in the forward drive range. The shift fork control mechanism 12 may actuate a synchronizer 29. It should be appreciated that if a synchronizer is not employed, the control 10 can be utilized to provide the on-going and off-going pressure required to activate the torque transfer devices used with a planetary gear set.

The subbranch feed conduit $18_C$ communicates with a normally open modulating solenoid valve 30 as well as a normally closed modulating solenoid valve 31 that serves to actuate a conventional converter clutch, which is sometimes identified as a lock-up mechanism, not shown. The modulating solenoid valve 30 communicates with a two-position spool valve member 35. As can best be seen in FIG. 2, the two-position spool valve member 35 has a housing 36 with an interior bore 38 that extends axially with respect to the housing 36. A spool member 40, reciprocates within the bore 38 between a spring-set position and a pressure-set position, as will be hereinafter more fully described. The spool member 40, by virtue of a plurality of lands 41 spaced axially along the shaft 39, defines a plurality of subchambers 42 within the valve bore 38, as will also be hereinafter more fully described.

As will become apparent from the description which follows, a particular structural member, component or arrangement may be employed at more than one location. When referring generally to that type of structural member, component or arrangement, a common numerical designation shall be employed. However, when one of the structural members, components, or arrangements so identified is to be individually identified it shall be referenced by virtue of a letter suffix employed in combination with the numerical designation employed for general identification of that structural member, component or arrangement Thus, there are five axially spaced lands associated with spool member 40. The lands are generally identified by the numeral 41, but the specific, individual lands are, therefore, identified as 41A, 41B, 41C, 41D and 41E in the specification and on the drawings. This suffix convention shall be employed throughout the specification.

Continuing with a description of the two-position spool valve 35, a control subchamber 42A is defined between the land 41A and the upper end face 43 of the bore 38. A subchamber 42B is defined between the lands 41A and 41B; a subchamber 42C is defined between the lands 41B and 41C; a subchamber 42D is defined between the lands 41C and 41D; and, a subchamber 42E is defined between the lands 41D and 41E. Additionally, a spring assist subchamber 42F is defined between the land 41E and the lower end face 43 of the bore 38.

Figure 11:
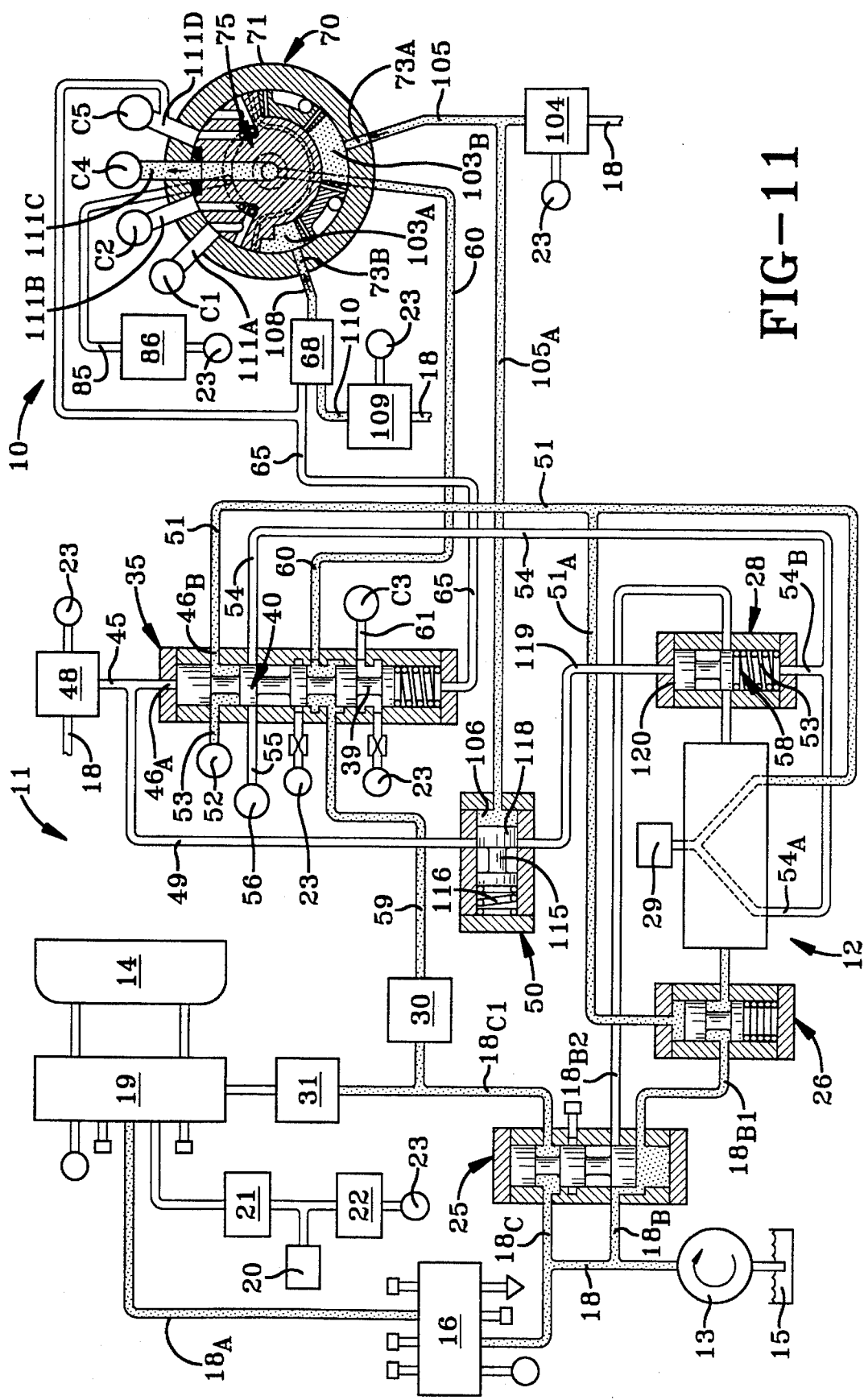
FIG. 11 is a view similar to FIGS. 1, 7 and 9 but with the valving arrangement depicted to effect the fourth drive ratio.
Figure 12:
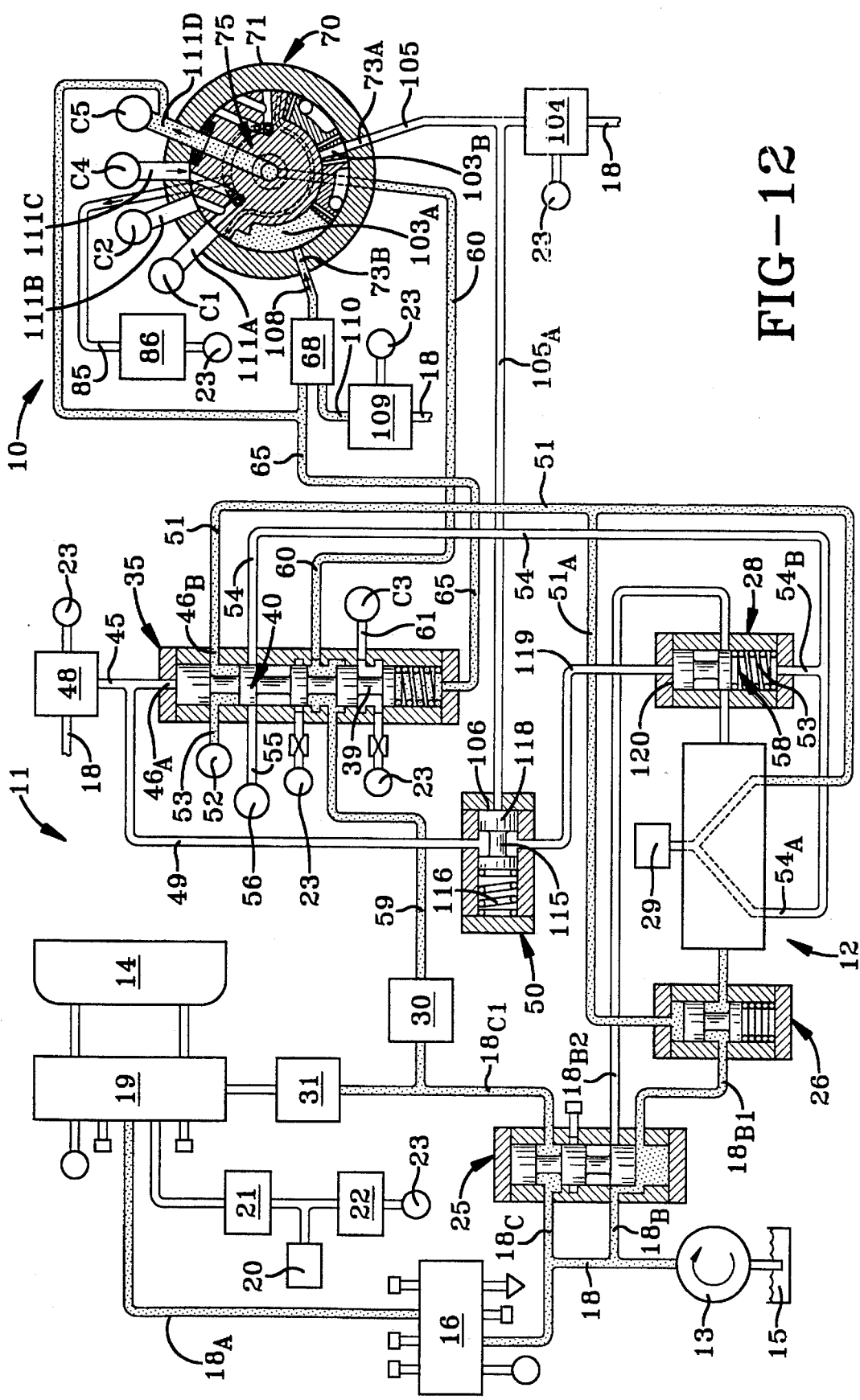
FIG. 12 is a view similar to FIGS. 1, 7, 9 and 11 but with the valving arrangement depicted to effect the fifth drive ratio.

The spool member 40 is biased within the bore 38 to the spring-set position depicted in FIGS. 1, 2, 7, 11 and 12 principally by virtue of a spring member 44 that acts between the land 41E and the lower end face 43 of the bore 38. The spring-set position may also be achieved by virtue of the force provided by the spring member 44, as supplemented by hydraulic pressure within the subchamber 42F, as represented in FIGS. 11 and 12.

A control conduit 45 communicates with the control subchamber 42A through a port $46_A$ in the upper end face 43 of the bore 38. A normally open on/off solenoid valve 48 communicates with the control chamber 42A of the two-position spool valve 35 via the control conduit 45, as can best be seen in FIGS. 1 and 2. The normally open, solenoid valve 48 also feeds a reverse pressure conduit 49 which communicates with the reverse flow control valve 28 through a forward-reverse inhibit valve 50.

A forward pressure signal transfer conduit 51 communicates with bore 38 through port $46_B$, and the bore 38 communicates with a forward drive range sensor 52 through a signal passage 53. The signal passage 53 communicates with the bore 38 through a port $46_C$ this is preferably disposed in opposition to port $46_B$. It will be observed that the description very carefully delineates communication with the bore 38 rather than to specific subchambers 42. This occurs because the specific subchamber 42 with which the various conduits and passages communicate will vary depending upon the position of the two-position spool valve member 40, and for that reason a discussion of the specific communication path through the spool valve 35 will be deferred until the operation of the control valving mechanism 10 is described. At this point, therefore, it shall only be noted that the forward pressure signal transfer conduit 51 communicates with both the shift fork control mechanism 12 and the forward flow control valve 26.

It should also be noted, however, that when the shift fork control mechanism 12 is in the forward drive position, pressurized hydraulic fluid is provided from the shift fork control mechanism through the forward pressure signal transfer conduit 51 to actuate the forward sensor 52 and also along control pressure signal transfer branch $51_A$ to establish the forward flow control valve 26 in the pressure-set position depicted in FIG. 1.

Figure 2:
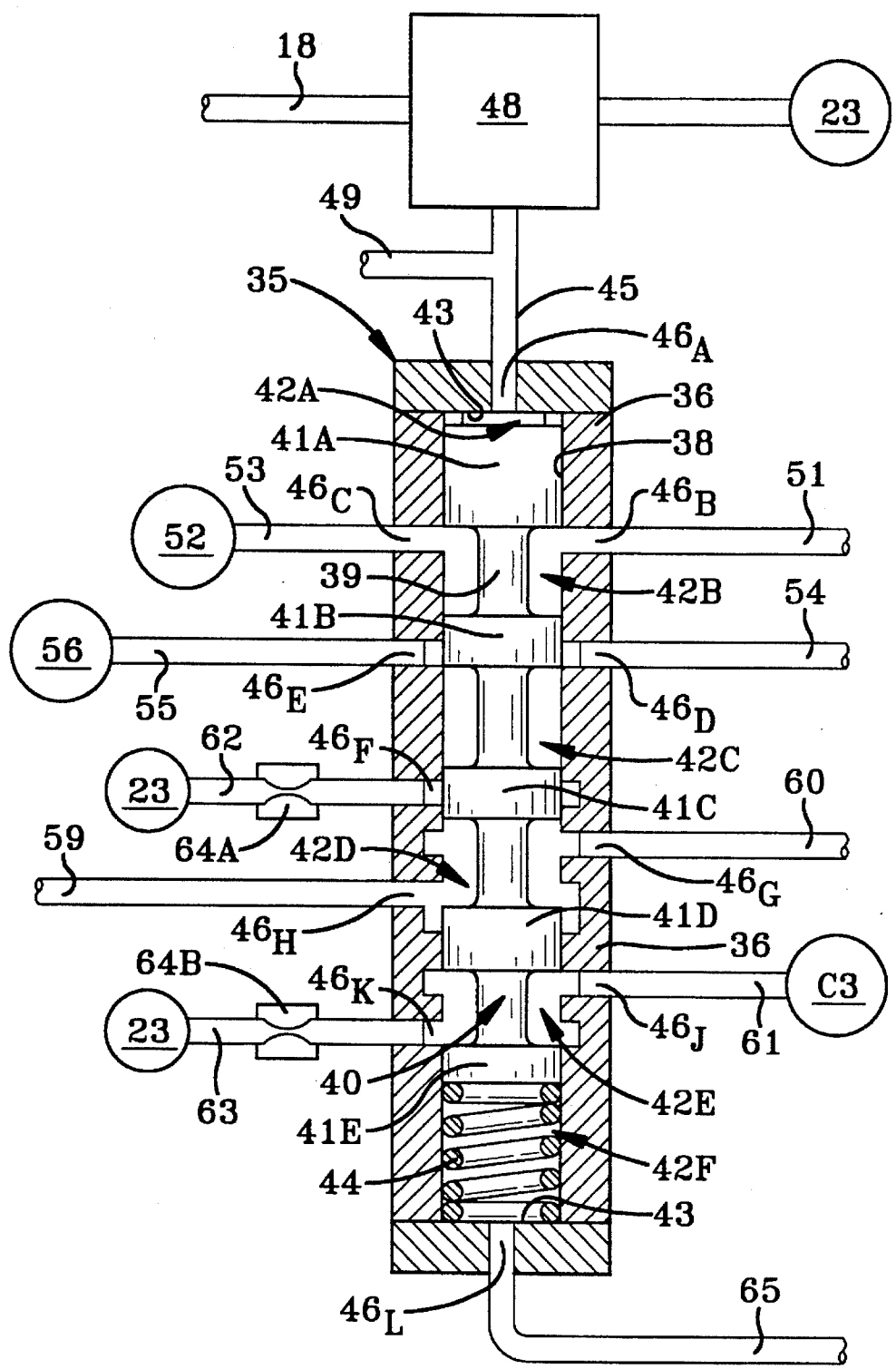
FIG. 2 is an enlarged representation of the two-position spool valve depicted in FIG. 1, the spool valve being depicted in longitudinal section and in the spring-set position.

With continued reference to FIG. 2, a reverse pressure signal transfer conduit 54 communicates with the bore 38 through port $46_D$, and an opposed port $46_E$ allows a signal passage 55 to communicate between bore 38 and a reverse sensor 56. The reverse pressure signal transfer conduit 54 is bifurcated at its other end (FIG. 1) such that branches $54_A$ and $54_B$ communicate, respectively, with the shift fork control mechanism 12 and a spring assist chamber 58 of the reverse flow control valve 28. A feed conduit 59 communicates between the normally open modulating control valve 30 and the bore 38 of the spool valve 35 through port $46_H$. Substantially opposite, though modestly offset axially with respect to port $46_H$, is a port $46_G$ by which a rotary valve feed conduit 60 communicates between the bore 38 of the spool valve 35 and the rotary valve 10. The rotary valve feed conduit 60 thus provides the communication between the spool valve 35 and the rotary valve 10 by which first, second, fourth and fifth drive ratios are actuated, as will be hereinafter more fully described.

Only the third (and reverse) drive ratios are actuated directly by the spool valve 35. As such, a third/reverse drive ratio torque transfer device C3 communicates with the spool valve bore 38 via a third/reverse drive ratio conduit 61 which opens to the bore 38 through port $46_J$. As can be seen, the spool valve 35 is also in communication with the return system 23 through a pair of exhaust conduits 62 and 63, which, respectively, open to the bore 38 through ports $46_F$ and $46_K$. The exhaust conduits 62 and 63 preferably include flow control restrictions 64A and 64B, respectively. The only other connection to the spool valve 35 is the spring assist conduit 65. Specifically, the spring assist conduit 65 opens through port $46_L$ and communicates, respectively, with a pressure selector shuttle valve 68.

Referring now to FIGS. 3 through 6, the structure of the rotary valve 70 incorporated in the rotary control valving mechanism 10 can be more readily seen. The rotary valve 70 has a housing 71, at least a portion of which is annular to define a cylindrical bore 72. The housing 71 also includes a pair of radially disposed solenoid communication ports 73A and 73B and four radially disposed torque transfer device feed ports 74A through 74D.

A rotor 75 is disposed within the cylindrical bore 72 for selective angular translation. As such, the rotor 75 has a first, substantially semi-cylindrical, sliding surface 76 which is preferably defined by the same radius as the interior surface of the cylindrical bore 72. As such, the rotor 75 is rotatable through preselected angular displacements with the surfaces 76 and 72 in sliding engagement. The rotor 75 also has a second, substantially semi-cylindrical, sliding surface 78 that is directed oppositely with respect to the first semi-cylindrical sliding surface 76 and which has a radial dimension that is substantially less than that of the cylindrical bore 72.

The first, semi-cylindrical surface sliding 76 of the rotor 75 is penetrated by a plurality of exhaust passages $79_A$ through $79_F$. Exhaust passage $79_B$ intersects exhaust passage $79_A$. Exhaust passage $79_E$ similarly intersects exhaust passage $79_F$. Exhaust passages $79_A$, $79_C$, $79_D$ and $79_F$ are connected by a plurality of axially extending exhaust passages 80A and 80B to an arcuate channel 81 that may be recessed into the face 82 of the rotor 75. An axial bore 83 in the casing 84 opens in opposition to the arcuate channel 81 in the rotor 75 and communicates with an exhaust conduit 85 that discharges through a check valve 86 into the pressure return system 23. The check valve 86 serves to control the drainage of hydraulic fluid in order to assure retention of a sufficient quantity of hydraulic fluid within the system for prompt operation thereof following drainage of any particular torque control device, as will be hereinafter more fully explained.

A central passage 88 extends axially through the rotor 75. One end may be plugged, as by engagement with the casing 84 in which the housing is received, but the other end of the central passage 88 communicates with the rotary feed conduit 60. As will become apparent, the hydraulic pressure supplied to the rotary valve 75 through the rotary feed conduit 60 will be selectively directed to the torque transfer devices C1, C2, C4 and C5 that sequentially apply and release the corresponding drive ratios. A radially oriented delivery passage 90 directs the flow of the hydraulic fluid from the central passage 88 to a recess 91 in the radially outer, first semi-cylindrical sliding surface 76 of the rotor 75. A combination quad ring 92 and seal 93 is received within the recess 91 to secure and maintain a positive seal between the rotor 75 and the cylindrical bore 72 through the housing 71, thereby preventing leakage of hydraulic fluid between the rotor 75 and the cylindrical bore 72 and maintaining the integrity of the fluid flow between the delivery passage 90 and each of the torque transfer feed ports 74, in turn. A ring seal 94 may circumscribe the juncture of the central passage 88 and the rotary valve feed conduit 60 to provide a positive sealing action between those conduits in the relatively rotatable rotor 75 and casing 84.

Figure 3:
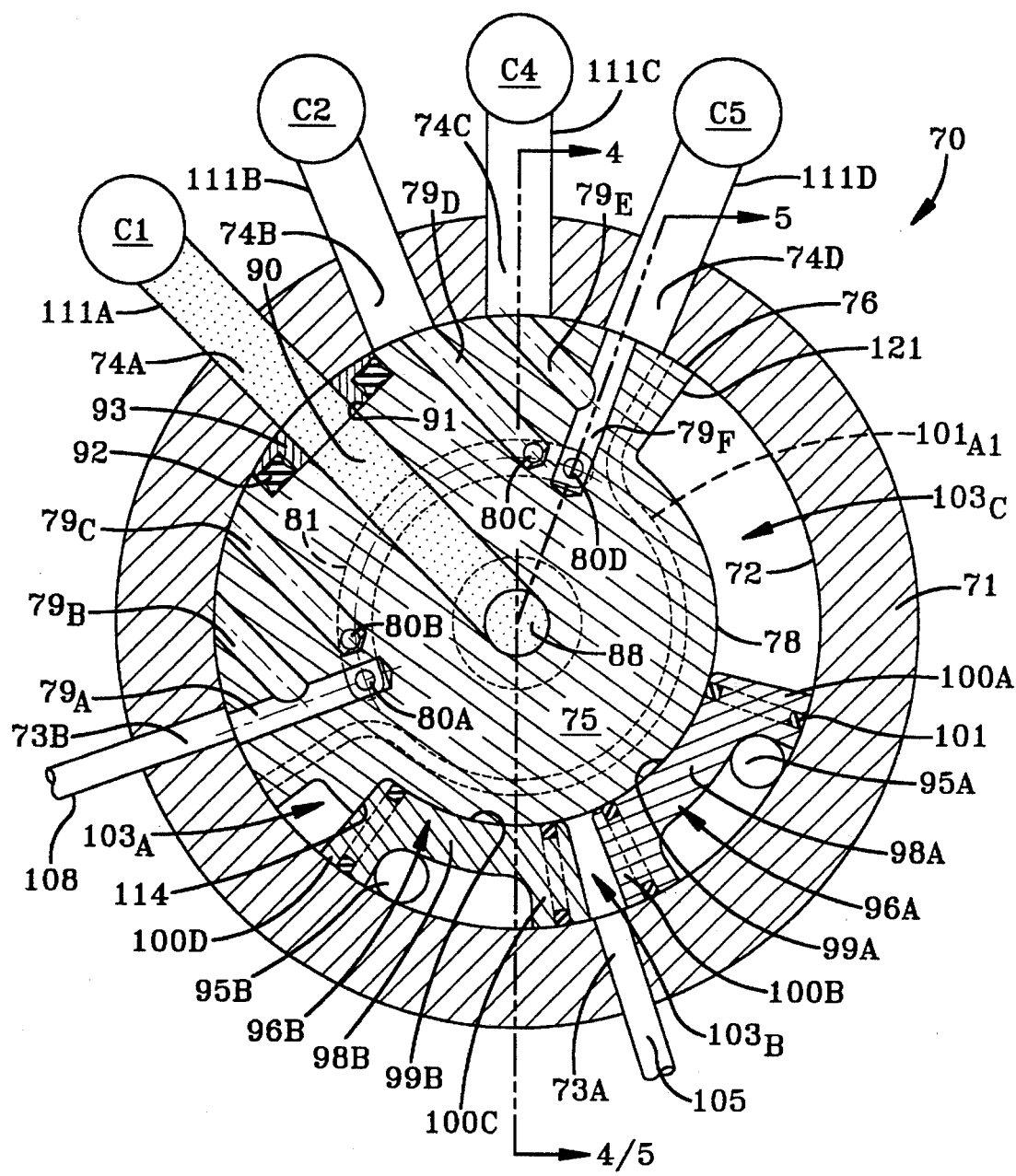
FIG. 3 is an enlarged representation of the rotary sequencing valve depicted in FIG. 1, the rotary valve being depicted in transverse section with the rotor disposed in the spring-set position whereby it is capable of actuating the torque transfer device for the first drive ratio.
Figure 5:
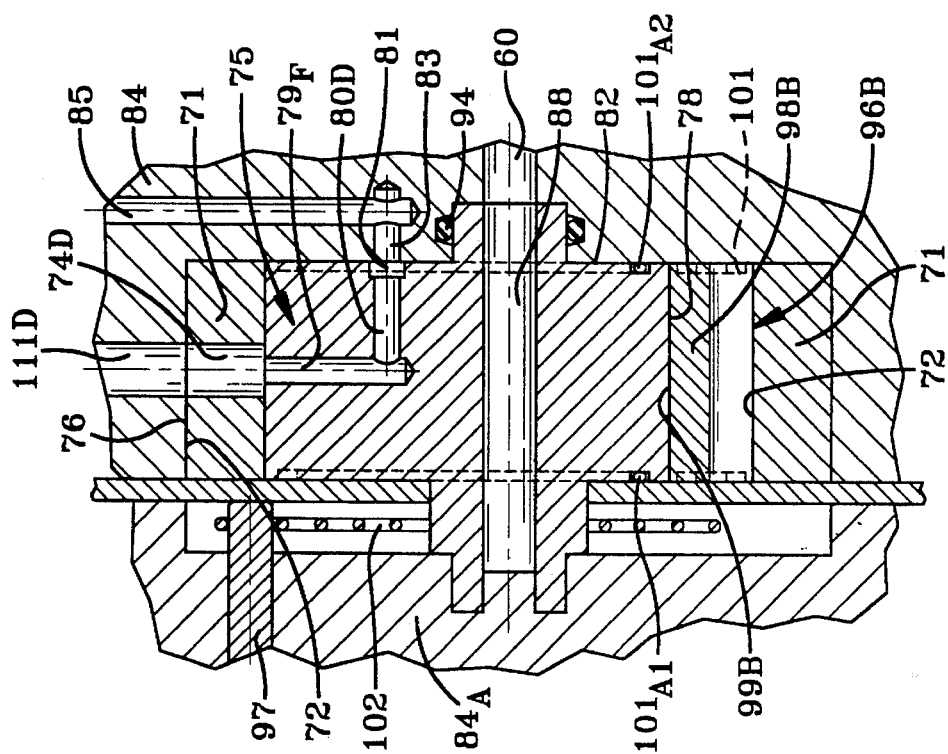
FIG. 5 is a reduced sectional view taken substantially along line 5—5 of FIG. 3.
Figure 4:
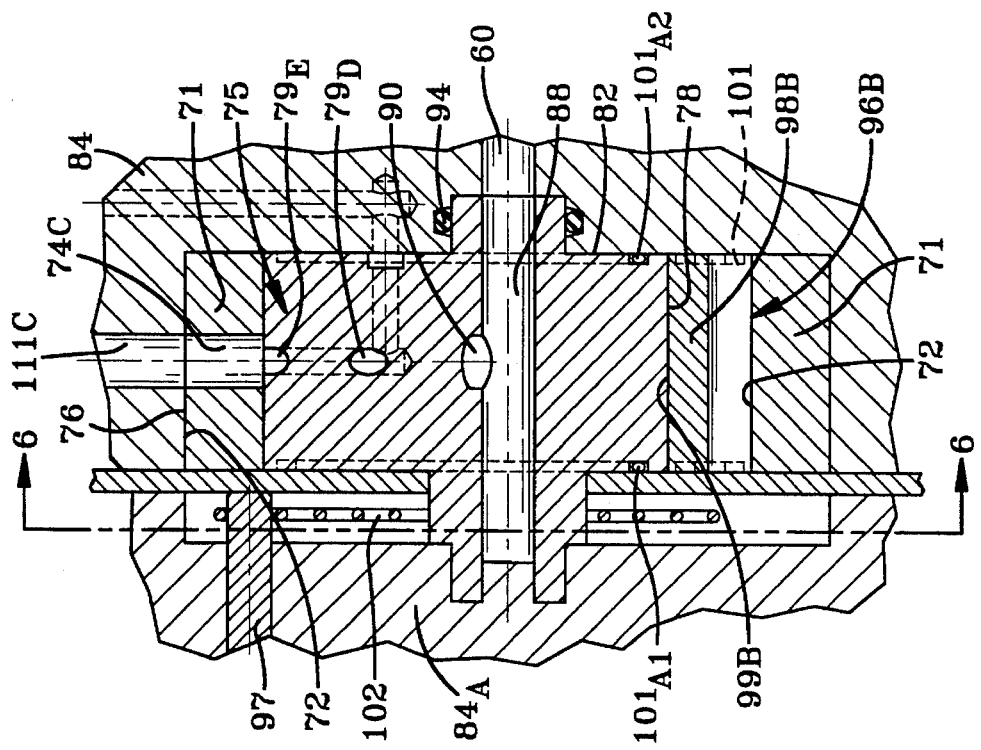
FIG. 4 is a reduced sectional view taken substantially along line 4—4 of FIG. 3.
Figure 6:
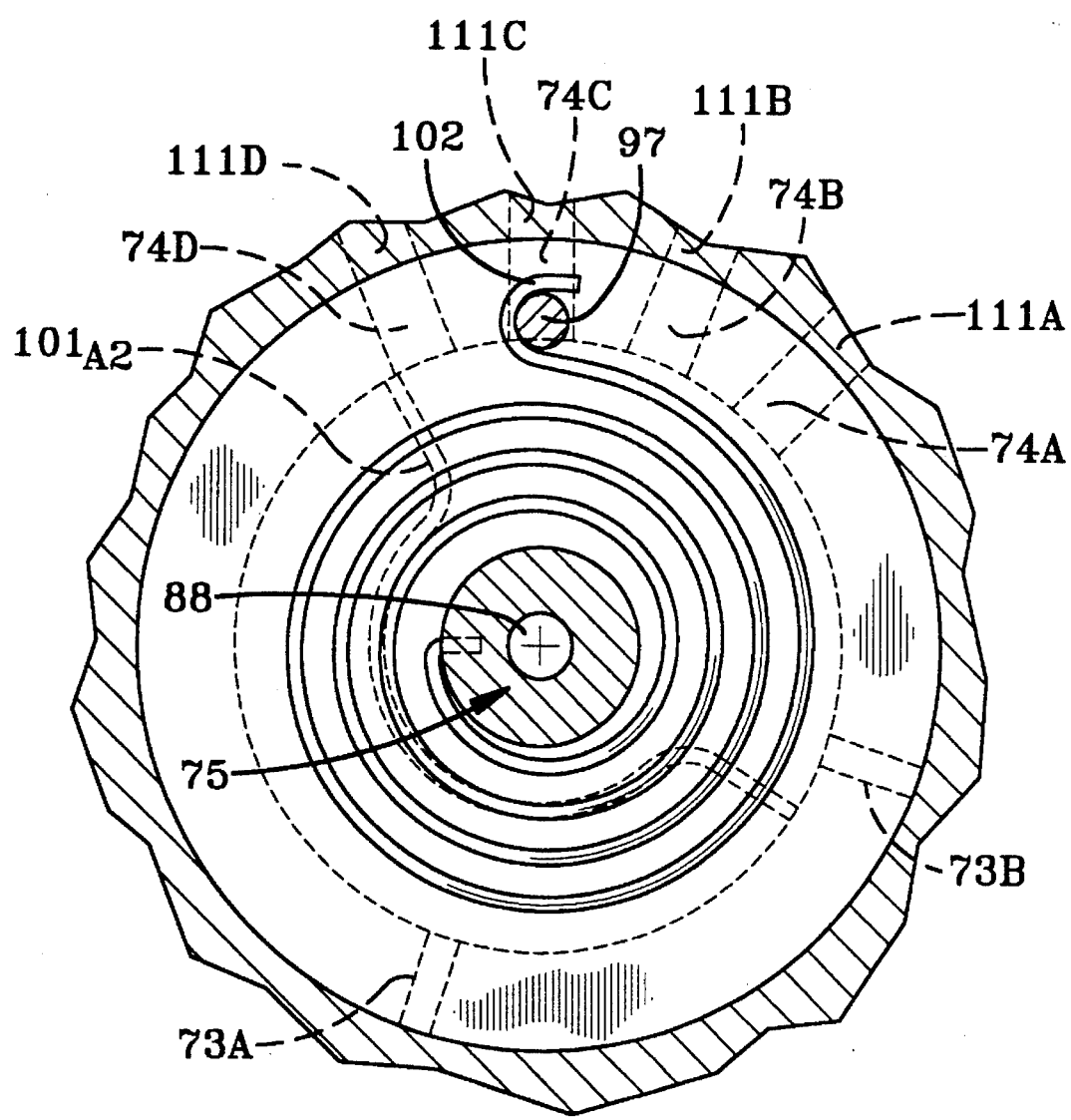
FIG. 6 is a reduced sectional view taken substantially along line 6—6 of FIG. 4.

As best seen from FIG. 3, the rotary valve 75 includes a pair of fixed dowel stops 95A and 95B secured to the housing 71 and located adjacent the cylindrical bore 72 at approximately the 4 o'clock and 7 o'clock positions, respectively, as the valve 70 as positioned in the drawing. The fixed dowel stops 95 each serve to determine the range of motion for a pair of circumferentially displaceable chamber wall members 96A and 96B, respectively. The circumferentially movable chamber wall members 96 each have a body portion 98 that presents a radially inner, concave face 99, the radius of which is substantially identical to that of the second, substantially semi-cylindrical, sliding surface 78 to facilitate a sliding, and sealing, engagement therebetween. The circumferentially movable chamber wall members 96 are each further defined by a pair of legs 100 (legs 100A and 100B on chamber wall member 96A and legs 100C and 100D on chamber wall member 96B) which extend radially outwardly from the circumferential ends of the body portion 98 and terminate radially outwardly in a surface that has a radius approximating that of the bore 72 to permit a sliding and sealing engagement therebetween. As shown, the chamber wall members 96 are fitted into the housing 71 such that each straddles one of the dowel stops 95. So positioned, the circumferentially movable chamber wall members 96 are interposed snugly between the rotor 75 and the cylindrical bore 72. Additionally, the movable chamber wall members 96 each include seals 101A, 101B, 101C and 101D strategically located to provide positive protection against leakage of hydraulic fluid between the legs 100 on each movable chamber wall member 96 and the remainder of the rotary valve 70.

As should now be apparent, the chamber wall members 96 may slide freely along the circumference of the cylindrical bore 72 to the extent permitted by the location of the dowel stops 95. As previously explained, the rotor 75 may also rotate within the housing 71, but the rotational range of movement is likewise limited by virtue of the movable chamber wall members 96. The range of movement of the chamber wall members 96 is, in turn, fixed by the dowel stops 95. The free motion of the rotor 75 within the housing bore 72 is also limited by the biasing pressure of a torsion spring 102 which tends to bias the rotor 75 in a counterclockwise direction (as viewed in FIG. 6) unless sufficient pressure is applied in the clockwise direction—as hereinafter described—to overcome the biasing pressure of spring 102. One end of the torsion spring is thus secured to the rotor member 75, and the other end to the housing 71, as by the axial pin 97.

It should also be apparent that a plurality of subchambers 103 will be defined radially between the second sliding surface 78 of the rotor and the bore 72 of the housing 71 as well as circumferentially between the rotor 75 and the two movable chamber wall members 96A and 96B. That is, subchamber $103_A$ is located between the rotor 75 and the chamber wall member 96B; subchamber $103_B$ is located between chamber wall members 96A and 96B; and, subchamber $103_C$ is located between chamber wall member 96A and the rotor 75.

The seals 101A through 101D effectively seal across legs 100 of each movable chamber wall member 96, and a free form wiper seal $101_A$ spans each end of the rotor 75 to preclude communication between the subchambers 103 and the other apertures that penetrate the rotor 75.

Before proceeding with the description of the operation, there are a few additional connections to the rotary valve 70 that should be described. As best seen in FIG. 1, a normally closed on/off solenoid valve 104 receives hydraulic pressure from an extension of the supply conduit 18, and that pressure is fed to the rotary valve 70 through a control conduit 105 that is connected to the first solenoid communication port 73A. A branch $105_A$ of the control conduit communicates with the control subchamber 106 in the forward-reverse inhibit valve 50.

The second select high shuttle valve 68 communicates with the solenoid communication port 73B by a control conduit 108. A normally open on/off solenoid valve 109 also receives hydraulic pressure from an extension of the supply conduit 18, and that pressure is fed to the second select high valve 68 through signal conduit 110.

A plurality of torque transfer devices, each representing a different drive ratio, are connected to the rotary valve 70 by way of the torque transfer device feed conduits 111. As such, torque transfer device C1 (which controls the first drive ratio) is connected to feed port 74A by feed conduit 111A. Torque transfer device C2 (which controls the second drive ratio) is connected to feed port 74B by feed conduit 111B. Torque transfer device C4 (which controls the fourth drive ratio) is connected to feed port 74C by feed conduit 111C. Torque transfer device C5 (which controls the fifth drive ratio) is connected to feed port 74D by feed conduit 111D.

Before embarking on a description as to the operation of the control valve mechanism 10 to which the present invention is directed, it should be understood that the explanation begins with a recapitulation as to the hydraulic fluid flow accomplished by positioning the manual range selection valve 25 in the forward drive position (FIG. 1). Specifically, the regulated line pressure fed from pump 13 through the main feed conduit 18 passes through the manual range selector valve 25, along the subbranch feed conduit $18_{C1}$ to the modulating solenoid valve 30.

To facilitate an understanding of a fairly complex hydraulic system, the pressurized conduits and passages have been modestly stippled in each of the drawings so that one may quickly and easily follow the flow of pressurized fluid through the complex hydraulic maze required to effect actuation of each drive ratio, as that drive ratio is described.

For those desiring a more detailed explanation as to the operation of the shift fork controller 12 in response to the aforementioned disposition of the manual range selector 25 in the forward drive position, reference should be had to the aforesaid, copending U.S. patent application, Ser. No. 08/104,967. In the forward drive range it should suffice to note that the shift fork control mechanism 12 supplies the pressure required properly to actuate the forward sensor 52 through forward pressure signal transfer conduit 51 and also to establish the forward flow control valve 26 in the pressure-set position depicted in FIG. 1.

OPERATION

By way of background, it should be understood that motor vehicle transmissions generally include selectively engageable gear elements for providing multiple forward speed ratios through which the output torque of the engine is applied to the drive wheels of the vehicle. In automatic transmissions, the gear elements which provide the various speed ratios are selectively activated, as through fluid operated friction torque transfer devices, such as clutches and brakes. Thus, shifting from one speed ratio to another generally involves releasing (disengaging) the torque transfer device(s) associated with the current speed ratio and applying (engaging) the torque transfer device(s) associated with the desired speed ratio. Any torque transfer device to be released during a particular shift sequence is conventionally referred to as the off-going torque transfer device, while the torque transfer device to be applied during that same shift sequence is referred to as the on-coming torque transfer device. There is generally a slight overlap between the "release" and "apply" of the torque transfer devices involved in a shift sequence, and high quality shifts are achieved only when the "release" and "apply" operations are properly timed and executed.

Conventionally, the shifting control effected by an automatic transmission is performed in conjunction with a logic control map and various inputs which effect such system parameters as vehicle speed, engine throttle position and engine torque fluid pressure signals representative of the various system parameters are processed in an on-board computer and/or microprocessor to determine when a shift is in order and to actuate, in accordance with the logic control map, electronically controlled valves in the hydraulic control system which respond to the signals received from the computer to effect the required engagement and/or disengagement (and in the proper order) of the appropriate torque transfer devices necessary to secure the desired speed ratio changes to the output shaft of the transmission.

Actuation of the First Drive Ratio

As shown by the stippling in FIG. 1, the first drive or gear ratio is established by actuating the on-going torque transfer device C1. All three of the on/off solenoids 48, 104 and 109 are in the hydraulically "off" state. The modulating solenoid 30, however, is in the hydraulically "on" state. As such, the flow of hydraulic fluid at substantially modulated line pressure is directed through the pressure supply feed conduit 59 to the two position spool valve 35. Because the on/off solenoid 48 is hydraulically off, the two position spool valve 35 is in the spring-set position. As such, the pressure supply feed conduit 59 is in communication with the rotary valve feed conduit 60 through the chamber 42D of the two position spool valve 35.

As can be seen best in FIG. 3, the rotor 75 of the rotary valve 70 is maintained in the full spring-torque position by the torsion spring 102 when there is no fluid pressure emanating from either of the on/off solenoids 104 or 102. With the rotor 75 in this full spring-torque position, the radially oriented delivery passage 90 is in alignment with the torque transfer device feed port 74A through the rotary valve housing 71. As such, the hydraulic pressure flows through the feed conduit 111A to actuate the first drive ratio torque transfer device C1. The transmission is thereby actuated into the first drive ratio.

Any off-going pressure from the three torque transfer devices C2, C4 or C5 back flows through the respective exhaust passages $79_D$, $79_E$ or $79_F$, that are aligned with the respective torque transfer device feed ports 74B, 74C and 74D when the rotor 75 is in the full spring-torque position. Any fluid being so discharged is directed through exhaust conduit 85 and into the hydraulic fluid return system 23.

Similarly, and referring again to FIG. 1, any off-going pressure from the third drive ratio torque transfer device C3 is exhausted through subchamber 42E to the hydraulic return system 23.

It should be apparent, therefore, that as on-going pressure is being directed to the first drive ratio torque transfer device C1 fluid pressure is being relieved and exhausted from the torque transfer device which may have been actuated prior to initiation of the actuation of the first drive ratio.

Actuation of the Second Drive Ratio

Figure 7:
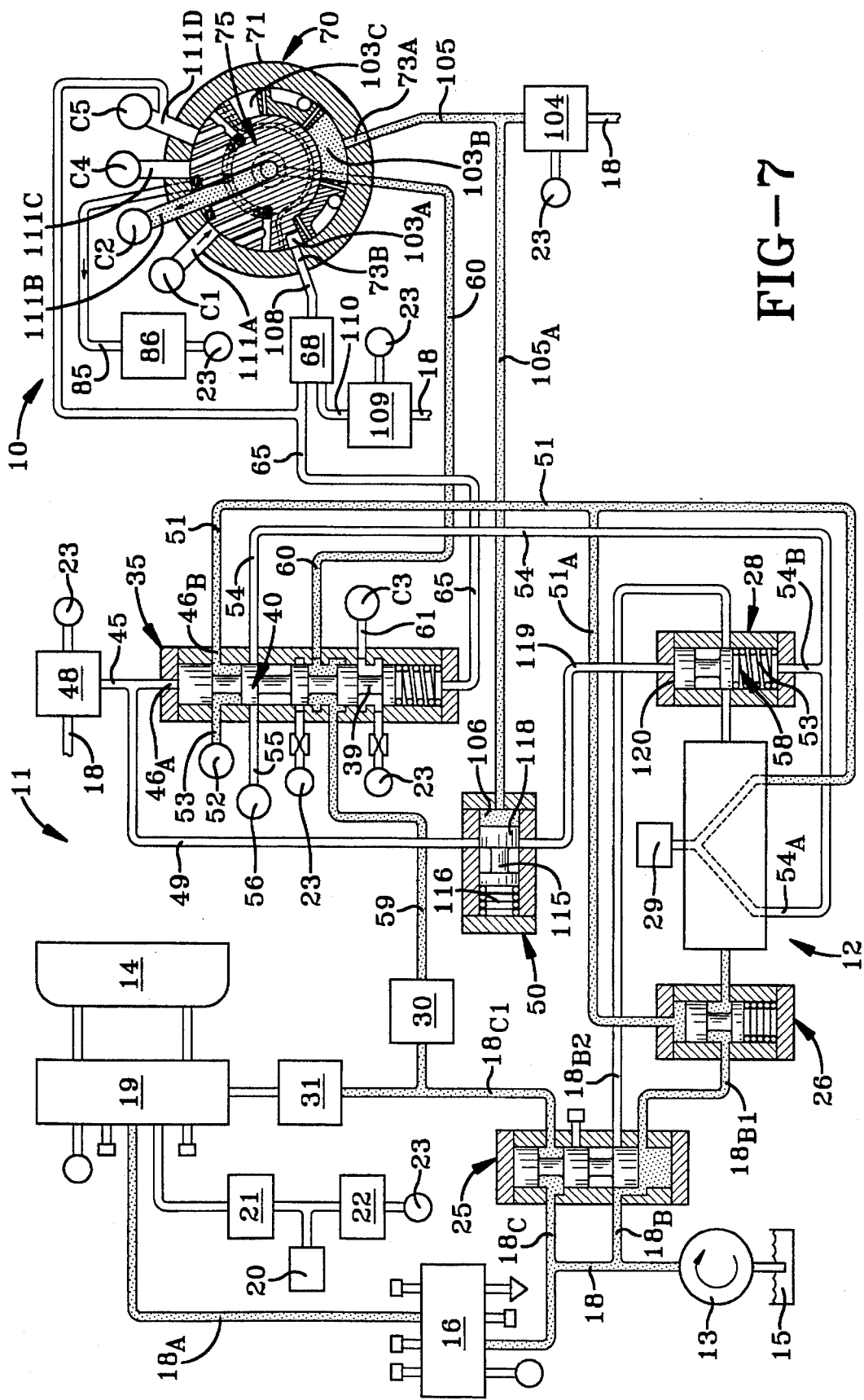
FIG. 7 a view similar to FIG. 1, but with the valving arrangement depicted to effect the second drive ratio.
Figure 8:
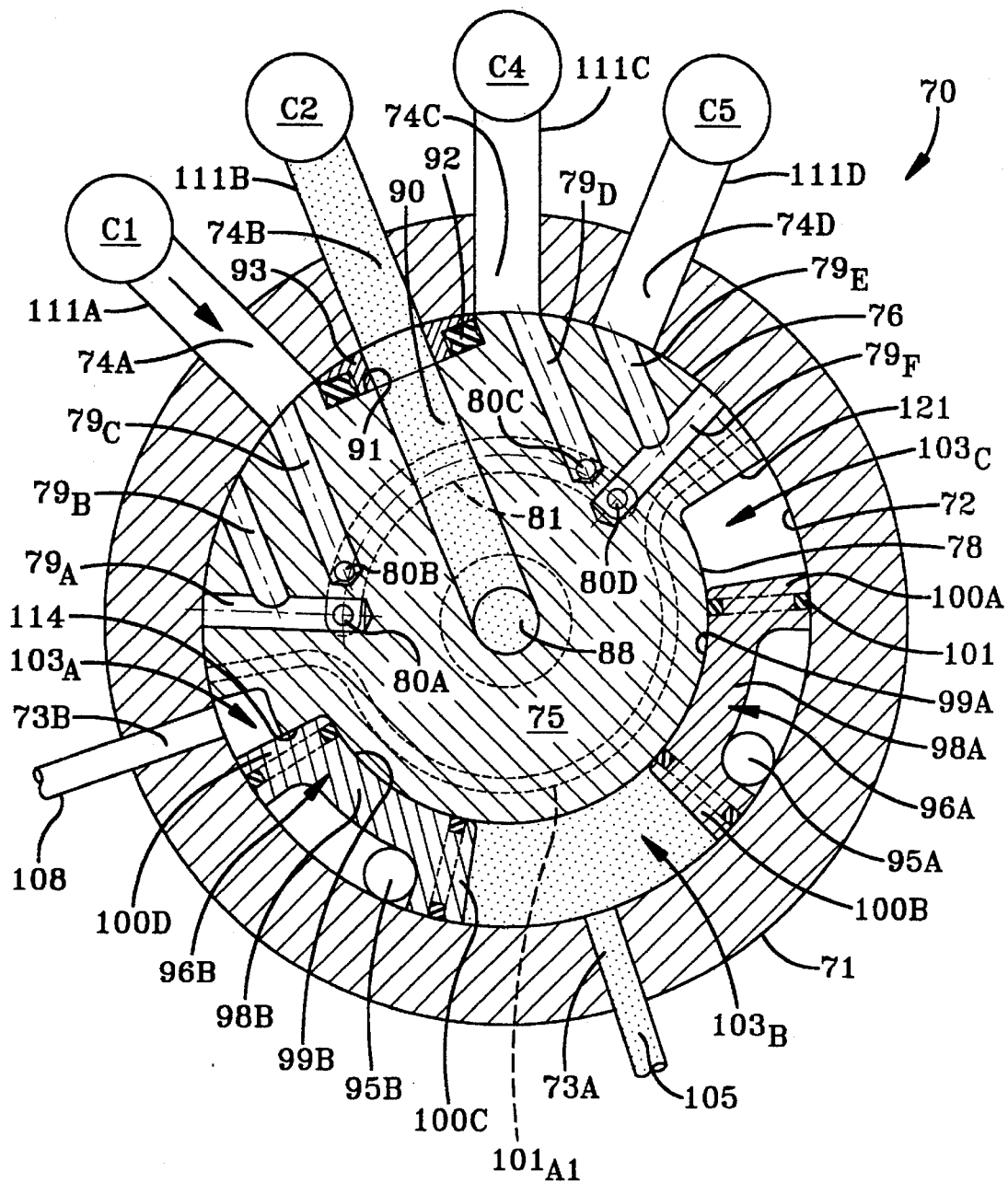
FIG. 8 is a view similar to FIG. 3 but with the rotary valve being depicted with the rotor disposed to permit actuation of the second drive ratio.

As shown by the stippling in FIG. 7, an upshift to the second drive or gear ratio is established by engaging the on-going torque transfer device C2 and substantially simultaneously disengaging the off-going torque transfer device C1, although a slight overlap is generally deemed desirable, as is well known to the art. Referring to FIGS. 7 and 8, operation of the second drive ratio C2 with the control mechanism 10 is accomplished by opening the normally closed on/off solenoid 104. In the open (or "on") position, pressurized hydraulic fluid will be admitted to control conduit 105 to pass through port 73A into subchamber $103_B$. The admission of pressurized hydraulic fluid in subchamber $103_B$ forces the chamber wall members 96A and 96B to move circumferentially apart from the position depicted in FIG. 3 to the position depicted in FIGS. 7 and 8. That is, the chamber wall member 96A is displaced circumferentially until the leg 100B engages the fixed dowel stop 95A. Similarly, because the fluid pressure emanating from the on/off solenoid 104 is greater than the torsional bias exerted by the torsion spring 102, when pressurized hydraulic fluid is directed into the subchamber $103_B$, the torsional bias provided by spring 102 is overcome and the rotor 75 is rotated due to the movement of the chamber wall 96B, and the chamber wall member 96B is displaced circumferentially until the leg 100C engages the fixed dowel stop 95B. Because the leg 100D on chamber wall member 96B engages a shoulder 114 located at the first transition between the first and second substantially semi-cylindrical sliding surfaces 76 and 78, the circumferential displacement of the chamber wall member 96B will rotate the rotor 75 against the biasing action of the torsion spring 102 to align the radially oriented delivery passage 90 with the torque transfer device feed port 74B through the rotary valve housing 71.

Because the on/off solenoid 48 remains closed—i.e.: in the hydraulically "off" state—the spool valve 35 continues in the spring-set position, allowing fluid to continue to flow through the spool valve 25 from the hydraulically open modulating solenoid 30. The on/off solenoid 109 likewise remains in the hydraulically closed or "off" position. The conditions described for the various solenoid valves permits the pressurized hydraulic fluid to continue to flow from the modulating solenoid valve 30 along the pressure supply feed conduit 59 and into the chamber 42D of the two position spool valve 35 to continue to provide pressurized hydraulic fluid to the rotary valve 70 through the rotary valve feed conduit 60 which is likewise in communication with the chamber 42D.

As such, the hydraulic pressure flows through the feed conduit 111B to actuate the second drive ratio torque transfer device C2. The transmission is thereby actuated into the second drive ratio.

During an up-shift, off-going pressure from the first drive ratio torque transfer device C1 is directed back along the feed conduit 111A, through feed port 74A into exhaust passage $79_C$ and eventually into the exhaust conduit 85 to the hydraulic return system 23.

Similarly, during a downshift, off-going pressure from the third drive ratio torque transfer device C3 would be directed to the hydraulic return system 32 via the third/reverse drive ratio conduit 61 which is in communication with the return system 23 through exhaust conduit 63, both of which would remain in communication with the chamber 42E in the two position spool valve 35.

It should also be observed from FIG. 7 that when the on/off solenoid 104 is opened (hydraulically "on"), pressurized hydraulic fluid flows along branch control conduit $105_A$ to pressurize the control subchamber 106 in the forward-reverse inhibit valve 50. The fluid pressure in subchamber 106 displaces the valve member 115 against the biasing of a compression spring 116 such that the land 118 on the valve member 115 closes communication between the reverse pressure conduit 49 and the transfer conduit 119 that communicates with the control subchamber 120 in the reverse flow control valve 28.

Actuation of the Third Drive Ratio

Figure 9:
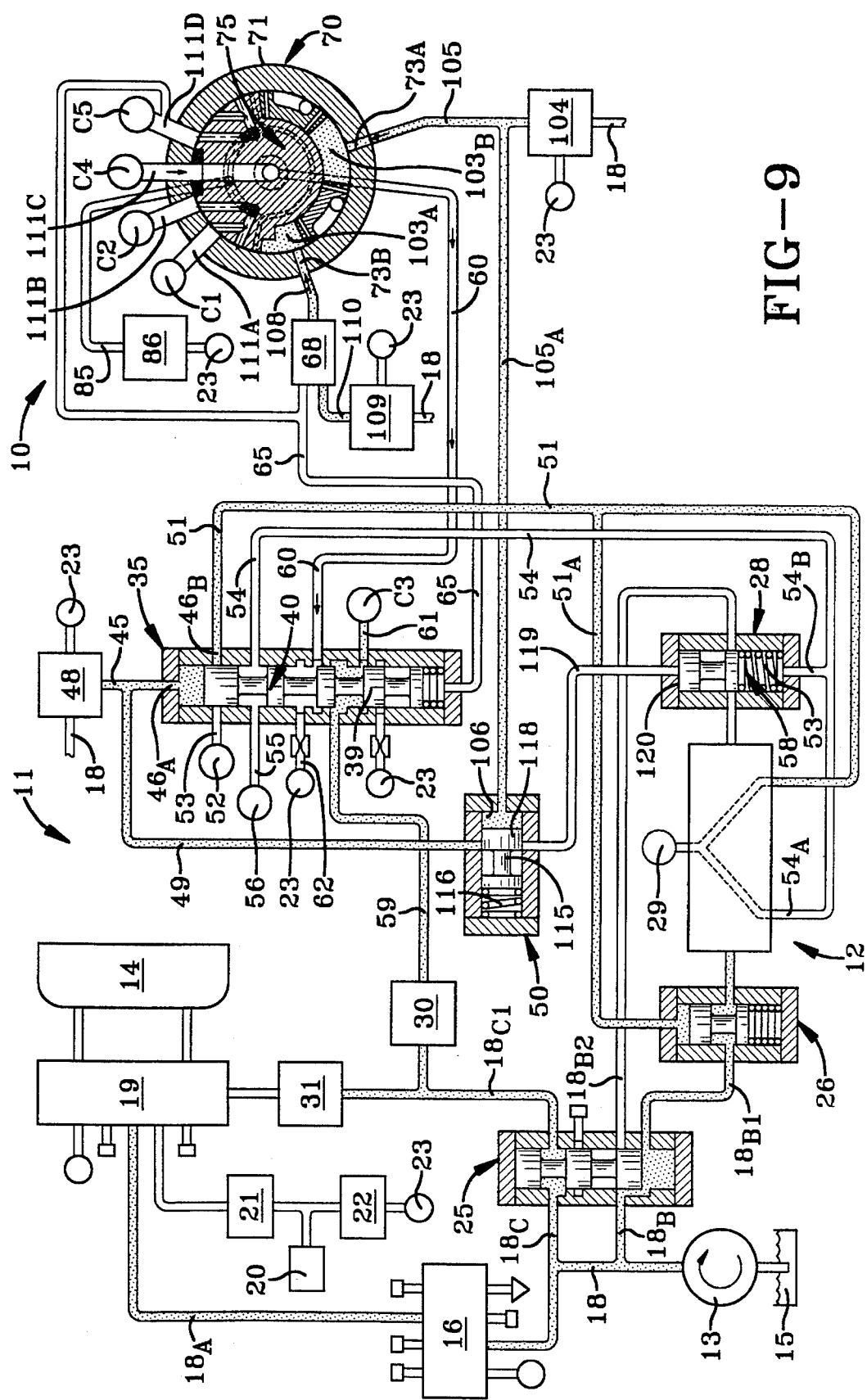
FIG. 9 is a view similar to FIGS. 1 and 7, but with the valving arrangement depicted to permit actuation of the third drive ratio.
Figure 10:
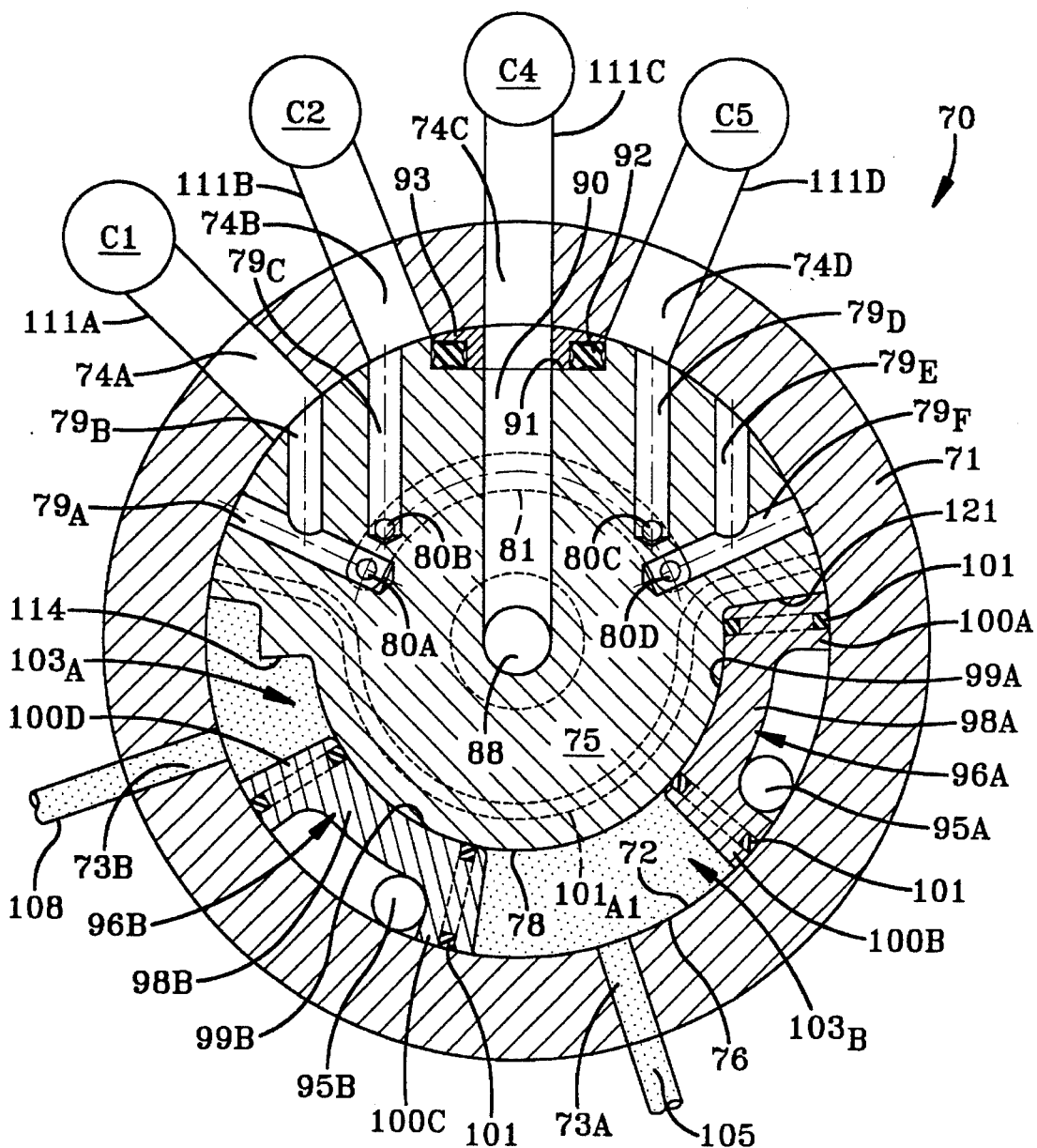
FIG. 10 is a view similar to FIGS. 3 and 8 but with the rotor being depicted in the position in which it is disposed when the third drive ratio is actuated, which is also the position in which the rotor is disposed to permit actuation of the fourth drive ratio.

As shown by the stippling in FIG. 9, an upshift to the third drive or gear ratio is established by engaging the on-going torque transfer device C3 and substantially simultaneously disengaging the off-going torque transfer device C2, although a slight overlap is generally deemed desirable, as is well known to the art. Referring to FIGS. 9 and 10, operation of the second drive ratio C3 with the control mechanism 10 is accomplished by opening all three of on/off solenoids 48, 104 and 109. In the open, or "on", position of solenoid 48 pressurized fluid is introduced into the control subchamber 42A, thereby axially translating the spool member 40 in the two-position spool valve 35 to the pressure-set position depicted in FIG. 9. In this position the forward sensor 52 is deactivated, and the reverse sensor 56 remains deactivated. To the on-board computer and/or microprocessor that combination signals the third drive ratio.

The solenoid 104 was open or "on" to activate the second drive ratio, and as will be recalled, the "on" position of solenoid 104 pressurized the subchamber $103_B$ to move the two chamber wall members 96A and 96B circumferentially apart to the maximum distance permitted by the fixed dowel ports 95A and 95B. By retaining the solenoid 104 in the open position, the chamber wall members 96A and 96B are maintained at the maximum circumferential separation. In addition, the valve member 115 in the inhibit valve 50 remains in the pressure-set position depicted in FIGS. 7 and 9.

Opening the on/off solenoid 109 introduces pressurized hydraulic fluid into subchamber $103_A$ through the second high pressure selector shuttle valve 68 along the control conduit 108 which connects to the communication port 73B and into subchamber $103_A$. The admission of hydraulic fluid at modulated line pressure into subchamber $103_A$ applies a force against the rotor 75 that is also greater than that applied by the torsion spring 102, and the rotor 75 is further rotated until the transition shoulder 121 (at the opposite intersection of the first and second substantially semi-cylindrical sliding surfaces 76 and 78) engages the leg 100A on the chamber wall member 96A.

The hydraulic pressure in subchamber $103_A$ is resisted by the biasing torsional action of the spring 102. Hence, the pressure in subchamber $103_B$ is sufficient to maintain the leg 100B of the movable chamber wall member 96A against the dowel stop 95A and that permits the rotation of the rotor 75 only to the position depicted in FIG. 10. So positioned, the second torque transfer device C2 communicates with the exhaust passage $79_C$ through port 74B, and, in the manner previously described, to the hydraulic return system 23 through exhaust conduit 85. In the pressure-set condition of the two-position spool valve 35, the rotary valve feed conduit 60 communicates with the subchamber 42C in the spool valve 35 and thus to the return system 23 through exhaust conduit 62. As such, any pressure within the torque transfer device C2 will be discharged at the rate established through the flow control restriction 64A.

With continued reference to FIG. 9, it will be observed that by retaining the modulating solenoid valve 30 open or "on", hydraulic fluid at modulated line pressure is directed along pressure supply feed conduit 59 into subchamber 42E and the third/reverse drive ratio conduit 61 to actuate the torque transfer device C3.

It would be necessary to exhaust the fourth drive ratio torque transfer device C4 in the event of a downshift to the third drive ratio. As shown, a backflow path is provided through the delivery passage 90, the central passage 88, the feed conduit 60, through subchamber 42D and into the return system 23.

Actuation of the Fourth Drive Ratio

As shown by the stippling in FIG. 11, an upshift to the fourth drive or gear ratio is established by engaging the on-going torque transfer device C4 and substantially simultaneously disengaging the off-going torque transfer device C3, although a slight overlap is generally deemed desirable, as is well known to the art. Referring to FIGS. 10 and 11, operation of the fourth drive ratio C4 with the control mechanism 10 is accomplished by closing the on/off solenoid 48. With the on/off solenoid 48 thus "off", the spool valve 35 will return to the spring-set position, thereby establishing communication between the pressure supply feed conduit 59 and the rotary valve feed conduit 60 through the subchamber 42D in the two-position spool valve 35. The return to the spring-set position of the two-position spool valve 35 also signals the forward drive range to forward sensor 52.

With no change in the state of the on/off solenoids 104 and 109, the rotary valve 70 will remain in the disposition depicted in FIG. 10, as previously described in conjunction with the actuation of the third drive ratio. Hence, with the two position spool valve 35 in the spring-set position, the modulating solenoid 30 will now direct the pressurized hydraulic fluid to actuate the fourth drive ratio torque transfer device C4. As depicted in FIG. 10, the central passage 88 directs the hydraulic fluid through the radially oriented delivery passage 90 and through the feed port 74C into feed conduit 111C to the torque transfer device C4 by which to establish the fourth drive ratio.

At the same time, off-going fluid pressure from the third drive ratio torque transfer device C3 exhausts to the hydraulic return system 23 through subchamber 42E of the two position spool valve 35.

The supply of pressurized hydraulic fluid through the feedback passage 112 to the first high pressure selector shuttle valve 66 can be ignored for the present inasmuch as that result relates to the reaction of the rotary control valving mechanism 10, and the shifting system 11, in response to a loss of electrical power, as will be hereinafter explained in detail.

In the event of a downshift to the fourth drive ratio from the fifth drive ratio, off-going pressure from the fifth drive ratio torque transfer device C5 would be exhausted to the hydraulic return system 23 by backflow through the feed port 74D and along the exhaust port $79_D$ to drain through the exhaust conduit 85 into the return system 23.

Actuation of the Fifth Drive Ratio

Figure 13:
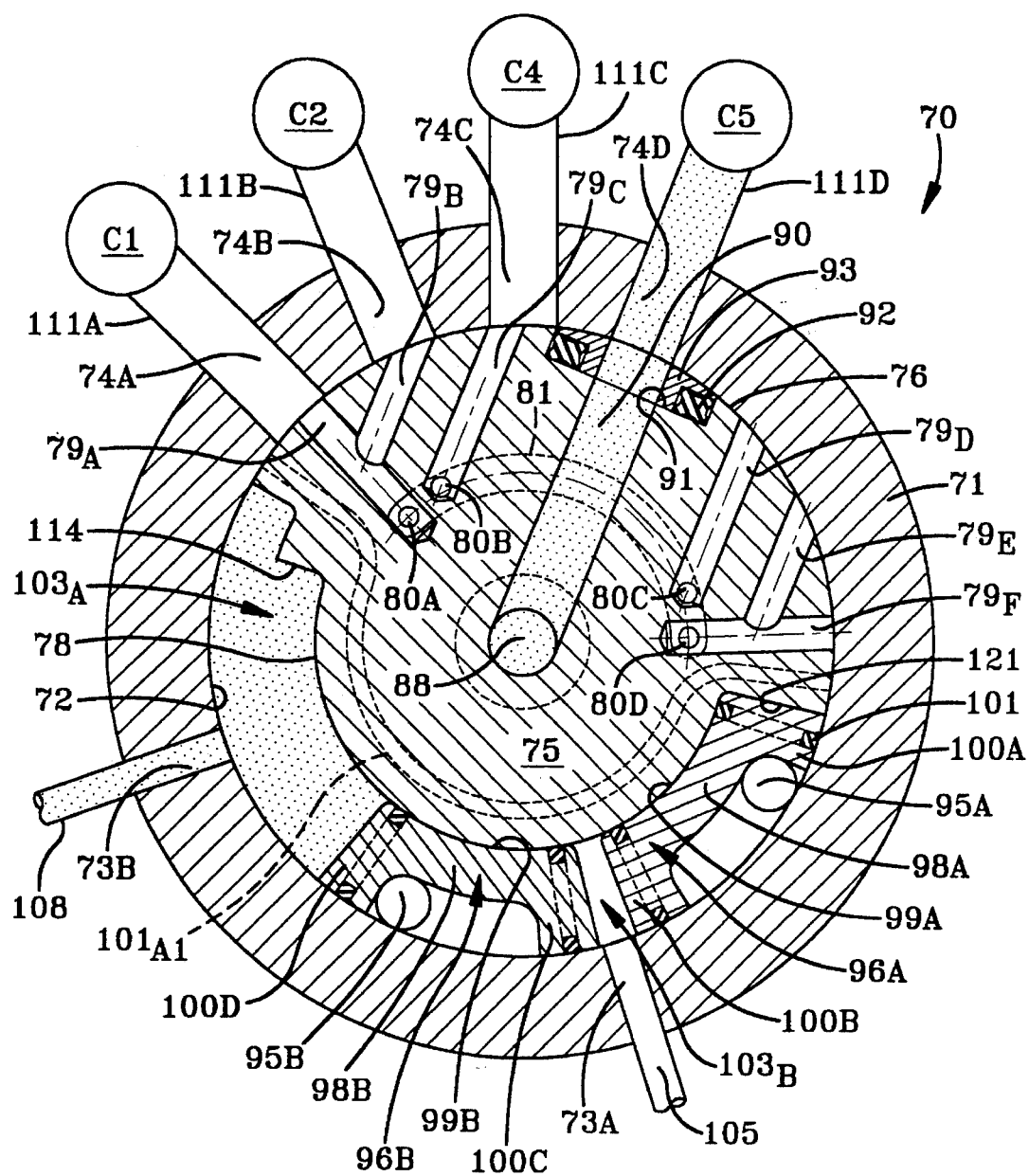
FIG. 13 is a view similar to FIGS. 3, 8 and 10 but with the rotary valve being depicted with the rotor disposed to permit actuation of the fifth drive ratio.
Figure 14:
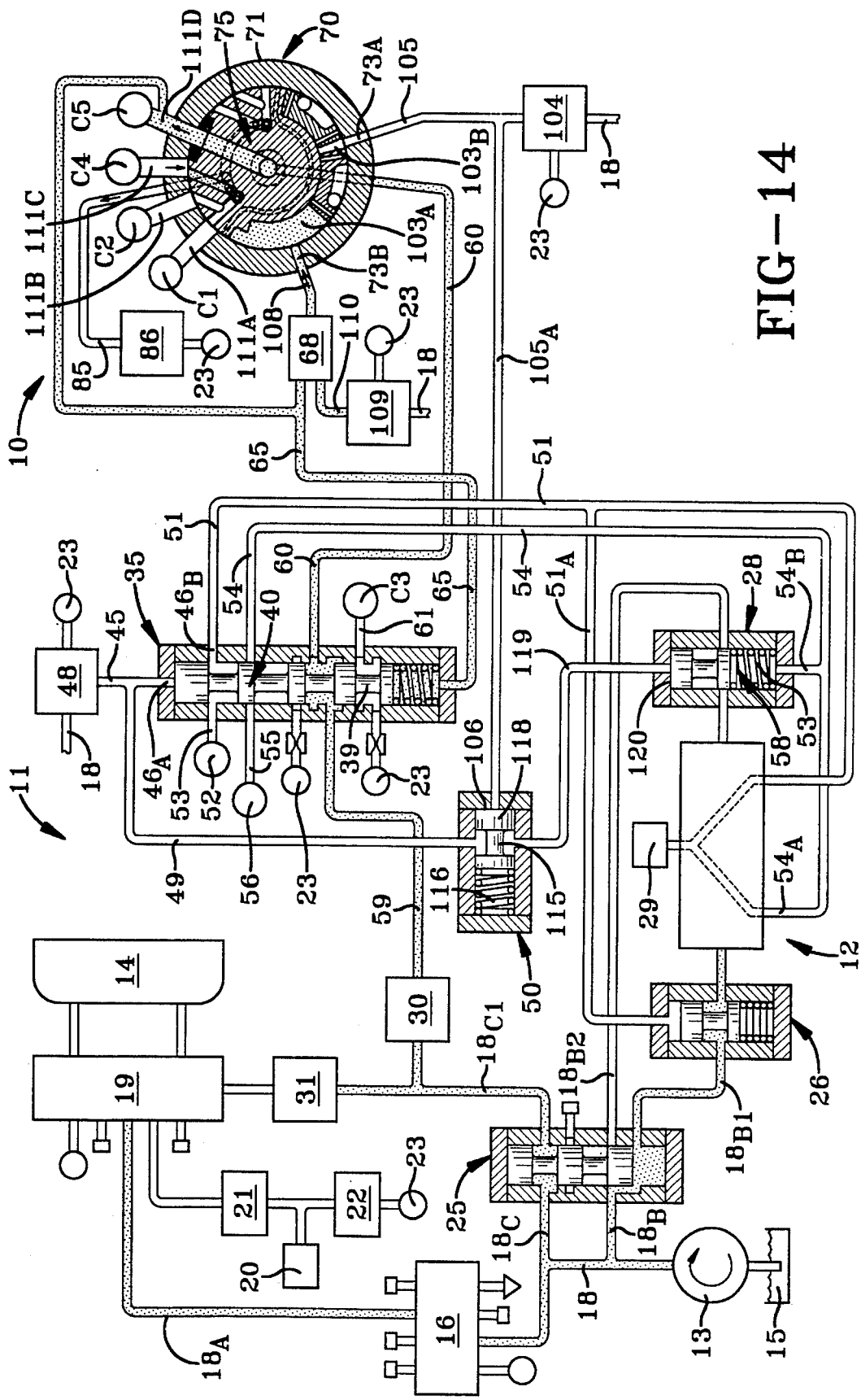
FIG. 14 is a view similar to FIGS. 1, 7, 9, 11 and 12 but with the valving arrangement depicted to effect operation of the transmission in the fifth drive ratio after a loss of electrical energy to the system while in either the fourth or the fifth ratio; and, FIG. 15 is a view similar to FIGS. 1, 7, 9, 11, 12 and 14 but with the valving arrangement depicted to effect operation of the transmission in the reverse drive range.

As shown by the stippling in FIG. 12, an upshift to the fifth drive or gear ratio is established by engaging the on-going torque transfer device C5 and substantially simultaneously disengaging the off-going torque transfer device C4, although a slight overlap is generally deemed desirable, as is well known to the art. Referring to FIGS. 12 and 13, operation of the fifth drive ratio C5 with the control mechanism 10 is accomplished by closing the on/off solenoid 104.

Thus, turning the on/off solenoid 104 "off" will, as shown by the sequential movement between FIGS. 10 and 13, allow the chamber wall member 96A to displace circumferentially until the leg 100A engages the fixed dowel stop 95A. Similarly, the chamber wall member 96B will be allowed to displace circumferentially until the leg 100D thereof engages the fixed dowel stop 95B. The simultaneous introduction of additional pressurized hydraulic fluid through the on/off solenoid valve 109 into subchamber $103_A$ through the second high pressure selector shuttle valve 68 (FIG. 12) and the control conduit 108 which connects to the communication port 73B will position the movable chamber wall members 96 against the dowel stops 95 as depicted in FIG. 13. The continued introduction of pressurized hydraulic fluid into subchamber $103_A$ continues to apply a force against the rotor 75 that is greater than that applied by the torsion spring 102. Hence, the rotor 75 will rotate until the transition shoulder 121 engages the leg 100A on the chamber wall member 96A. So positioned, the radially oriented delivery passage 90 is aligned with the feed port 74D to deliver pressurized fluid through the feed conduit 111D to actuate the torque transfer device C5 that establishes the fifth drive ratio.

With the two-position spool valve 35 remaining in the spring-set position, fluid pressure will be directed from the modulating solenoid 30 to the rotary valve 70, as was described in the actuation of the first, second and fourth drive ratios above. Only at this point in time, the pressurized fluid from the modulating solenoid 30 is directed to the fifth drive ratio torque transfer device C5 through the rotary valve 70, as represented in FIGS. 12 and 13. The fifth drive ratio is thereby actuated.

Off-going pressure from the fourth drive ratio torque transfer device C4 is exhausted to the hydraulic return system 23 through the exhaust port 74C which opens to the exhaust passage $79_C$.

Operation under a Loss of Electrical Energy

The present control 10 is designed to default to the third drive ratio during a loss of electrical energy when the transmission is operating in the first, second or third drive ratio. The present control 10 also defaults to the fifth drive ratio should the loss of electrical energy occur during operation in the fourth or fifth drive ratio.

In order to understand the foregoing defaults, it is important to note that the modulating solenoid 30, as well as the on/off solenoids 48 and 109, are normally open—i.e.: hydraulically "on"—such that fluid flow is permitted between the line pressure side of the valve and the outlet of the valve when they are not electrically energized. However, the on/off solenoid 104 is normally closed—i.e.: it is hydraulically "off"—when not electrically energized such that no fluid flow is permitted between the line pressure side of the valve and the outlet of the valve. The use of a normally open configuration for the modulating solenoid 30 facilitates the provision of a desired operational failure mode for the control 10 when the system experiences a loss of electrical power.

With reference to FIG. 1 (the first drive ratio) or FIG. 7 (the second drive ratio), a loss of electrical power while operating in the first or second drive ratio will open the on/off solenoid 48. Conversely, and with reference to FIG. 9 (the third drive ratio), if the loss of electrical power occurs while in the third drive ratio, the on/off solenoid 48 remains open. Any of the three events will result in the two position spool valve 35 being in the pressure-set position depicted in FIG. 9. As such, the modulating solenoid 30—which remains open during a loss of electrical energy—is now in direct communication with the third drive ratio torque transfer device C3 via the subchamber 42D of the two position spool valve 35, as depicted in FIG. 9. Because the flow of fluid pressure from the modulating solenoid 30 is being diverted to the third drive ratio torque transfer device C3, no pressurized hydraulic fluid will be conveyed to the rotary valve 70 via the rotary valve feed conduit 60.

Without electrical power, the on/off solenoid 104 is hydraulically closed or "off", and without electrical power, the on/off solenoid 109 is hydraulically open or "on". As such, the rotor 75 of the rotary valve 70 will be disposed in the same position as it was for operation of the fifth drive ratio discussed above and as represented in FIG. 12. This results in the first and second drive ratio torque transfer device feed ports 74A and 74B, respectively, aligning with the exhaust passages $79_A$ and $79_B$, respectively. This allows the off-going pressures from either the first or second drive ratio torque transfer devices C1 and C2 to be exhausted to the hydraulic return system 23.

With reference now to FIG. 12 (the fifth drive ratio), a loss of electrical power while operating in the fifth drive ratio will effect a default to the fifth drive ratio. This result is accommodated by employing the spring passage 65.

The pressure applied against land 41A by the hydraulic pressure in control subchamber 42A through the normally open solenoid 48 will move the valve 35 to the pressure set position thereby engaging C3 and exhausting C4 if electrical power is disconnected in fourth ratio.

With the solenoid valve 104 "off" as a result of an electrical power failure and with the normally open on/off solenoid 109 "on", the rotary valve 70 is disposed as depicted in FIGS. 12 and 13 to actuate or maintain the operation the torque transfer device C5.

Actuation of the Reverse Drive Ratio

Figure 15:
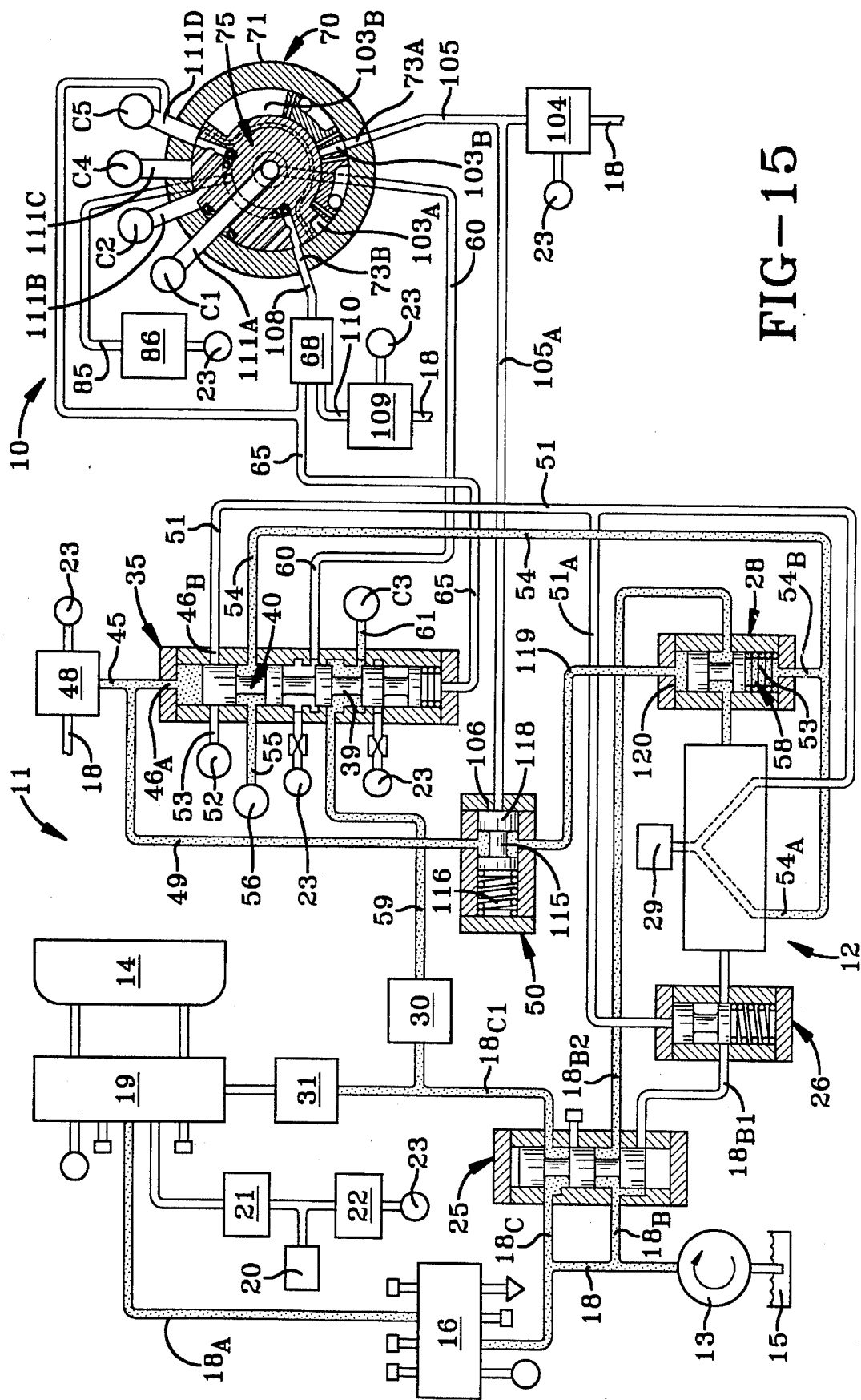

In order to actuate the reverse drive range, the manual range selector valve 25 is moved to the reverse drive range, as depicted in FIG. 15. As such, hydraulic fluid at modulated line pressure continues to flow along feed subbranch $18_{C1}$ to the modulating solenoid valve 30. However, modulated line pressure no longer flows through subbranch $18_{B1}$. Rather, modulated line pressure flows along the subbranch feed conduit $18_{B2}$ to the reverse flow control valve 28.

With on/off solenoid valve 48 opened—or "on"—pressurized hydraulic fluid flows along the reverse pressure conduit 49 and through the forward-reverse inhibit valve 50 to charge the control chamber 120 in the reverse flow control valve 28, thus permitting the hydraulic pressure admitted into the shift fork control mechanism 12 to shift to the reverse position, with appropriate actuation of the synchronizer 29, as is well known to the art.

Opening the on/off solenoid 48 also moves the spool member 40 in the two-position spool valve 35 to the pressure-set position. So positioned, the reverse pressure signal transfer conduit 54 pressurizes chamber 42B to actuate the reverse sensor 56, thus signalling operation in the reverse range.

Torque transfer device C3 actuates the reverse drive ratio when the shifting system 11 is operating in the reverse range. Accordingly, the pressurized hydraulic fluid provided through the modulating solenoid valve 30 and the pressure supply feed conduit 59 passes through subchamber 42D to enter the third/reverse drive ratio conduit 61 and actuate torque transfer device C3 to effect operation of the reverse drive ratio.

CONCLUSION

The foregoing description of the exemplary embodiment of the invention has been presented for the purposes of illustration and description. It is not intended to be exhaustive or to limit the invention to the precise form disclosed. Obvious modifications or variations are possible in light of the above teachings. The exemplary embodiment was chosen and described to provide the best illustration of the principals of the invention and its practical application in order to enable one of ordinary skill in the art to utilize the invention in various embodiments and with various modifications as are suited to the particular use contemplated. All such modifications and variations are within the scope of the invention as determined by the appended claims, when interpreted in accordance with the breadth to which they are fairly, legally and equitably entitled.

As should now be apparent, the present invention not only teaches that an automatic transmission control embodying the concepts of the present invention is capable of sequencing the torque transfer devices used to actuate the selected drive ratios, but also accomplishes the other objects of the invention. As such, it should be appreciated from the foregoing description of the forward drive ratios that each ratio requires the engagement of a different torque transfer device. It should also be apparent from the foregoing description that the transition between successive forward ratios is accomplished by the disengagement of one of the torque transfer devices and the substantially simultaneous engagement of another torque transfer device. It should further be apparent that when a given torque transfer device is hydraulically engaged, all of the remaining transfer devices are open to the hydraulic return system. This is accomplished by a unique control system that employs a two-position spool valve in combination with three, on/off solenoids, a modulating solenoid and a unique rotary valve.

The embodiments of the invention in which an exclusive property or privilege is claimed are defined as follows:

1. In a shifting system for a power transmission having a source of pressurized fluid and a two-position valve for directing the pressurized fluid to at least one torque transfer device for actuating a selected drive ratio and for directing the pressurized fluid to a rotary control valve mechanism for actuating a plurality of selected drive ratios, said rotary control valve mechanism comprising:

a housing with a cylindrical bore therein;

a rotor received within said cylindrical bore and selectively sequenceable through a plurality of angular dispositions;

a pressure feed passage in said rotor;

control means selectively to rotate said rotor to each of said plurality of angular dispositions;

said feed passage communicating with a selected torque transfer device at each of said angular dispositions of said rotor to apply on-going hydraulic pressure thereto;

exhaust passageways in said rotor;

said exhaust passageways communicating with at least an off-going torque transfer device at each said angular disposition of said rotor.

2. A rotary control valve mechanism in a shifting system for a power transmission, as set forth in claim 1, wherein said control means selectively to rotate said rotor to each of said plurality of angular dispositions further comprises:

chamber wall members movably received within said housing to define expandable subchambers;

said chamber wall members engaging said rotor to position said rotor in response to selective admission of pressurized hydraulic fluid within said expandable subchambers.

3. A rotary control valve mechanism in a shifting system for a power transmission, as set forth in claim 2, further comprising:

biasing means to urge said rotor toward engagement with one of said chamber wall members.

4. A rotary control valve mechanism in a shifting system for a power transmission, as set forth in claim 3, wherein said control means selectively to rotate said rotor to each of said plurality of angular dispositions further comprises:

a pair of on/off solenoid valves selectively to direct pressurized fluid to two of said subchambers to position said chamber wall members.

5. A rotary control valve mechanism in a shifting system for a power transmission, as set forth in claim 4, wherein said control means selectively to rotate said rotor to each of said plurality of angular dispositions further comprises:

a pair of fixed dowel means secured to said housing to limit the angular disposition of said chamber wall members.

6. A rotary control valve mechanism in a shifting system for a power transmission, as set forth in claim 2, further comprising:

torque transfer devices to effect first, second, fourth and fifth drive ratios communicating with said rotary valve;

a high pressure selector shuttle valve communicating with said subchamber in said rotary valve to effect that angular disposition of said rotor to effect the fifth drive ratio in the event said on/off solenoid valves are deprived of electrical power.

7. An automatic power transmission drive ratio control comprising:

a source of fluid pressure;

a two-position spool valve;

a control chamber incorporated in said spool valve;

a first on/off solenoid valve connected with said source of fluid pressure;

a control conduit means for directing fluid from said first on/off solenoid valve to said control chamber in said spool valve to effect a pressure-set state for said two-position spool valve when said first on/off solenoid valve is on;

spring means for biasing said spool valve means to effect a spring-set position when said first on/off solenoid valve is off;

a rotary valve;

a feed conduit;

a rotor disposed within said rotary valve in communication with said feed conduit;

a supply passage disposed within said rotor;

a plurality of exhaust passages disposed within said rotor;

a torque transfer device supply conduit connected to said source of fluid pressure and to said rotary valve through said spool valve;

a second on/off solenoid valve connected with said source of fluid pressure;

a first rotary valve control conduit connecting said second on/off solenoid valve with said rotary valve;

a third on/off solenoid valve connected with said source of fluid pressure;

a second rotary valve control conduit connecting said third on/off solenoid valve with said rotary valve;

a plurality of torque transfer devices;

each torque transfer device effecting a selected drive ratio; and, a modulating solenoid valve connected to said source of fluid pressure and to said spool valve for directing fluid flow to selected torque transfer devices.

8. An automatic transmission drive ratio control, as set forth in claim 7, wherein said spool valve further comprises:

a hydraulic return system; and, an axially extending spool valve member having a plurality of lands spaced axially therealong to define a plurality of chambers.

9. An automatic transmission drive ratio control, as set forth in claim 8, wherein said modulating solenoid is in selective communication with said rotary valve feed conduit when said spool valve is in the spring-set position; and, said modulating solenoid is in selective communication with one of said torque transfer devices when said spool valve is in a pressure-set position.

10. An automatic transmission drive ratio control, as set forth in claim 7, wherein said rotary valve further comprises:

a housing for receiving said rotor;

a plurality of fixed stops affixed in said housing;

a plurality of floating stops slidably received in said housing;

a plurality of torque transfer device feed conduits connected to said torque transfer devices and in selective communication with said torque transfer device supply conduit.

11. An automatic transmission drive ratio control, as set forth in claim 10, wherein said rotary valve further comprises torsion spring means for spring biasing said rotor in said housing.

12. An automatic transmission drive ratio control, as set forth in claim 11, wherein said rotor of said rotary valve is rotated by fluid pressure emanating from said first and second solenoid valve when said first and second solenoid valves are on; and, said rotor is thereby selectively positioned within said housing.

13. An automatic power transmission drive ratio control comprising:

a source of fluid pressure;

a two-position spool valve;

a control chamber incorporated in said spool valve;

a first on/off solenoid valve connected with said source of fluid pressure;

a control conduit means for directing fluid from said first on/off solenoid valve to said control chamber in said spool valve to effect a pressure-set state for said two-position spool valve when said first on/off solenoid valve is on;

spring means for biasing said spool valve means to effect a spring-set state when said first on/off solenoid valve is off;

a rotary valve;

said rotary valve having a housing with a cylindrical bore therein;

a rotor received within said cylindrical bore and selectively sequenceable through a plurality of angular dispositions;

a pressure feed passage in said rotor;

control means selectively to rotate said rotor to each of said plurality of angular dispositions;

a plurality of torque transfer devices, each torque transfer device being selected to actuate a predetermined drive ratio;

said feed passage communicating with a selected torque transfer device at each of said angular dispositions of said rotor to apply on-going hydraulic pressure thereto;

exhaust passageways in said rotor;

said exhaust passageways communicating with at least an off-going torque transfer device at each said angular disposition of said rotor;

a second on/off solenoid valve connected with said source of fluid pressure;

a first rotary valve control conduit connecting said second on/off solenoid valve with said rotary valve;

a third on/off solenoid valve connected with said source of fluid pressure;

a second rotary valve control conduit connecting said third on/off solenoid valve with said rotary valve; and, a modulating solenoid valve connected to said source of fluid pressure and to said spool valve for directing fluid flow to selected torque transfer devices.

14. An automatic power transmission drive ratio control, as set forth in claim 13, further comprising:

chamber wall members movably received within said housing to define three expandable subchambers;

said chamber wall members engaging said rotor to position said rotor in response to selective admission of pressurized hydraulic fluid within two of said expandable subchambers;

said second and third on/off solenoid valves communicating with two of said three expandable subchambers.

15. An automatic power transmission drive ratio control, as set forth in claim 14, further comprising:

biasing means to urge said rotor toward engagement with one of said chamber wall members.

16. An automatic power transmission drive ratio control, as set forth in claim 15, further comprising:

a pair of fixed dowel means secured to said housing to limit the angular disposition of said chamber wall members.

17. An automatic power transmission drive ratio control, as set forth in claim 16, further comprising:

torque transfer devices to effect first, second, fourth and fifth drive ratios communicating with said rotary valve;

a high pressure selector shuttle valve communicating with said subchamber in said rotary valve to effect the angular disposition of said rotor to effect the fifth drive ratio in the event said on/off solenoid valves are deprived of electrical power.

* * * * *